US012628214B1

(12) United States Patent
Yuan et al.

(10) Patent No.: US 12,628,214 B1
(45) Date of Patent: May 12, 2026

(54) BLUETOOTH INTERNAL AUDIO ROUTING FOR SYSTEM LACK OF HARDWARE SUPPORT

(71) Applicant: Amazon Technologies, Inc., Seattle, WA (US)

(72) Inventors: Shuangqing Yuan, Fremont, CA (US); Hans Edward Birch-Jensen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 772 days.

(21) Appl. No.: 16/011,266

(22) Filed: Jun. 18, 2018

(51) Int. Cl.

| | |
|---|---|
| *H04W 76/15* | (2018.01) |
| *G06F 3/16* | (2006.01) |
| *G06F 13/42* | (2006.01) |
| *H04R 3/00* | (2006.01) |
| *H04W 76/14* | (2018.01) |
| *H04W 84/18* | (2009.01) |

(52) U.S. Cl.
CPC ............ *H04W 76/15* (2018.02); *G06F 3/162* (2013.01); *G06F 13/4282* (2013.01); *H04R 3/00* (2013.01); *H04W 76/14* (2018.02); *H04R 2420/07* (2013.01); *H04W 84/18* (2013.01)

(58) Field of Classification Search
CPC ..... H04W 76/15; H04W 76/14; H04W 84/18; G06F 3/162; G06F 13/4282; H04R 3/00; H04R 2420/07; H04R 2420/09
See application file for complete search history.

(56) References Cited

U.S. PATENT DOCUMENTS

| | | | | | |
|---|---|---|---|---|---|
| 8,001,290 | B2 * | 8/2011 | Beckert | .............. | B60R 16/0315 |
| | | | | | 710/36 |
| 2004/0097263 | A1 * | 5/2004 | Katayama | .............. | H04W 4/46 |
| | | | | | 455/11.1 |
| 2006/0270347 | A1 * | 11/2006 | Ibrahim | ................. | H04H 20/08 |
| | | | | | 455/41.2 |
| 2007/0124526 | A1 * | 5/2007 | Sinai | ................... | G06F 13/4022 |
| | | | | | 710/306 |
| 2007/0135046 | A1 * | 6/2007 | Kapur | ................... | H04W 76/14 |
| | | | | | 455/41.2 |
| 2008/0070516 | A1 * | 3/2008 | Lee | .......................... | H04R 5/04 |
| | | | | | 455/90.1 |

(Continued)

OTHER PUBLICATIONS

Bal et al., Vehicle Audio Distribution Hub (U.S. Appl. No. 62/563,166), Sep. 26, 2017, USPTO, whole document (Year: 2017).*

*Primary Examiner* — Michael Thier
*Assistant Examiner* — Jose L Perez
(74) *Attorney, Agent, or Firm* — Kilpatrick Townsend & Stockton LLP

(57) ABSTRACT

A computer-implemented method includes establishing, by a device, a first wireless audio link between a phone and a Bluetooth speaker via the device and establishing, by the device, a second wireless audio link between the Bluetooth speaker and the phone via the device. The Bluetooth speaker includes a local speaker and a microphone. The method also includes receiving, by the device, first audio data from the phone, and transmitting, by the device, the first audio data to the Bluetooth speaker. The method further includes receiving, by the device, second audio data from the microphone of the Bluetooth speaker and transmitting, by the device, the second audio data to the phone.

20 Claims, 10 Drawing Sheets

(56)                    References Cited

U.S. PATENT DOCUMENTS

2008/0287063 A1*  11/2008  Kidron .................. G10L 19/167
                                                                455/41.2
2008/0291863 A1*  11/2008  Agren ............. H04N 21/43637
                                                                370/503
2010/0317397 A1*  12/2010  Sinai ........................ H03M 1/12
                                                                700/94
2011/0300900 A1*  12/2011  Fleming .................. H04M 1/04
                                                                455/555
2012/0057518 A1*  3/2012  Herrala ................. H04W 84/20
                                                                370/315
2012/0155670 A1*  6/2012  Rutschman ......... H04M 1/6066
                                                                381/74
2012/0165006 A1*  6/2012  Ge ........................ H04W 88/04
                                                                455/423
2012/0165008 A1*  6/2012  Ge ........................ H04W 88/04
                                                                455/426.1
2012/0276912 A1*  11/2012  Zhang .................. H04W 76/10
                                                                455/450
2013/0064386 A1*  3/2013  Yerrace ................. H04R 5/033
                                                                381/79
2013/0201275 A1*  8/2013  Zhong ................. H04M 1/6066
                                                                348/14.02
2013/0237285 A1*  9/2013  Sinai .................... H04B 7/2659
                                                                455/557
2013/0331034 A1*  12/2013  Tucker ............... H04M 1/6066
                                                                455/41.2
2014/0073188 A1*  3/2014  Fritchman ............ G06F 13/385
                                                                439/620.21
2014/0073256 A1*  3/2014  Newham ................ H04W 4/80
                                                                455/41.3
2014/0119407 A1*  5/2014  Miller ................... H04B 1/713
                                                                455/7
2015/0126249 A1*  5/2015  Muraoka ............ H04M 1/6083
                                                                455/558
2015/0372746 A1*  12/2015  Xie ........................ H04B 7/155
                                                                455/11.1
2016/0227354 A1*  8/2016  Zhao ...................... H04W 4/80
2017/0126873 A1*  5/2017  McGary ........... H04M 1/72522
2018/0116003 A1*  4/2018  Gu .......................... H04W 4/80
2018/0173661 A1*  6/2018  Rand ........................ H04R 3/12
2018/0317009 A1*  11/2018  Feld ......................... H04R 5/04
2019/0042336 A1*  2/2019  McElrath ............. G06F 9/4887
2019/0058958 A1*  2/2019  Proctor, Jr. ............ G06F 3/165
2019/0098408 A1*  3/2019  Bal .......................... H04R 5/04
2019/0159285 A1*  5/2019  Li ...................... H04W 72/085
2019/0180740 A1*  6/2019  Nandy ................. G10L 15/30
2019/0327778 A1*  10/2019  Morris ................ H04W 88/04

* cited by examiner

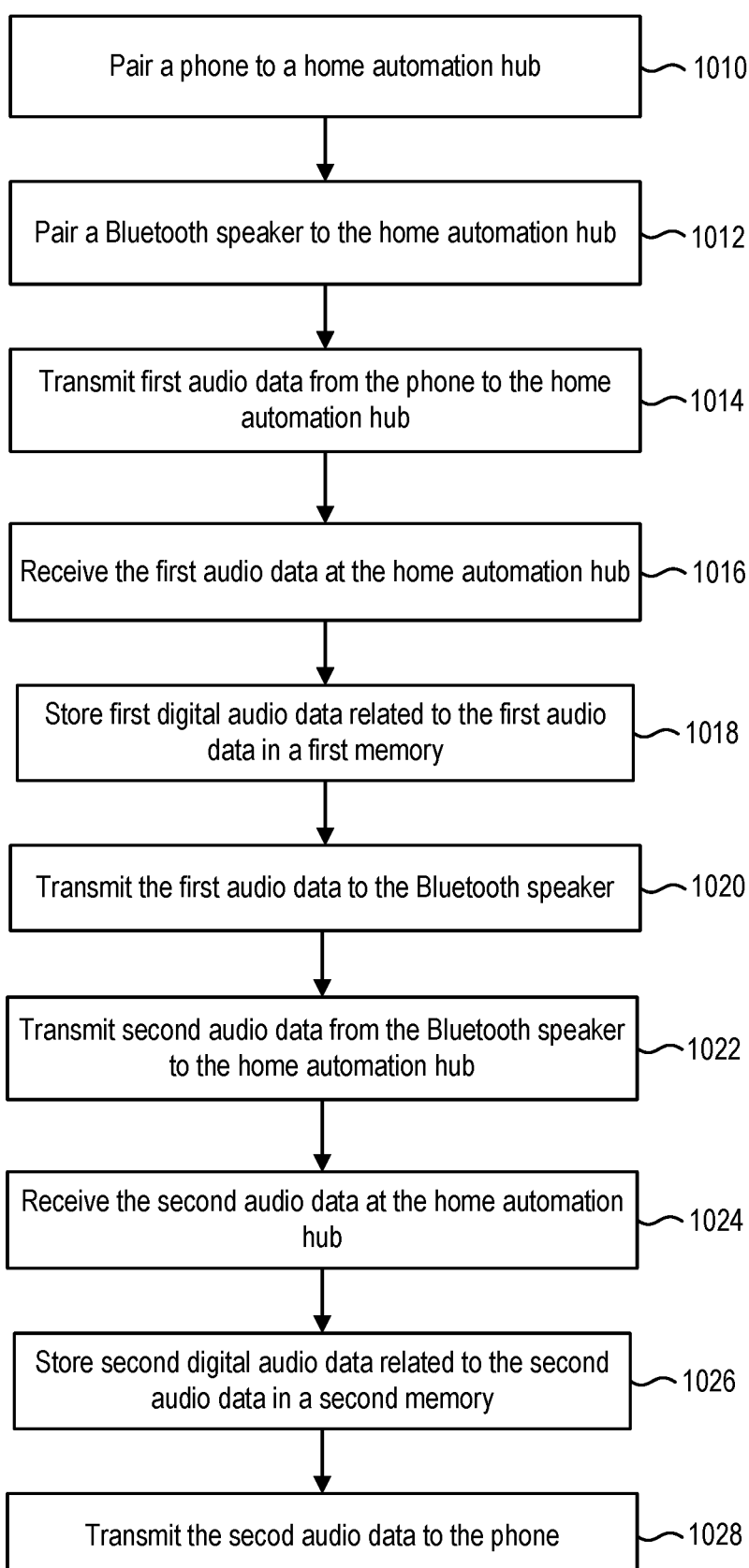

| Pair a phone to a home automation hub | 1010 |

| Pair a Bluetooth speaker to the home automation hub | 1012 |

| Transmit first audio data from the phone to the home automation hub | 1014 |

| Receive the first audio data at the home automation hub | 1016 |

| Store first digital audio data related to the first audio data in a first memory | 1018 |

| Transmit the first audio data to the Bluetooth speaker | 1020 |

| Transmit second audio data from the Bluetooth speaker to the home automation hub | 1022 |

| Receive the second audio data at the home automation hub | 1024 |

| Store second digital audio data related to the second audio data in a second memory | 1026 |

| Transmit the secod audio data to the phone | 1028 |

FIG. 10

BLUETOOTH INTERNAL AUDIO ROUTING FOR SYSTEM LACK OF HARDWARE SUPPORT

BACKGROUND

With the advancement of technology, the use and popularity of electronic devices has increased considerably. Electronic devices are commonly used to capture, process, and transmit image and audio data.

BRIEF DESCRIPTION OF THE DRAWINGS

Various embodiments in accordance with the present disclosure will be described with reference to the drawings, in which:

FIG. 10 is a flowchart conceptually illustrating a method of performing a hands free phone call according to examples of the present disclosure.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
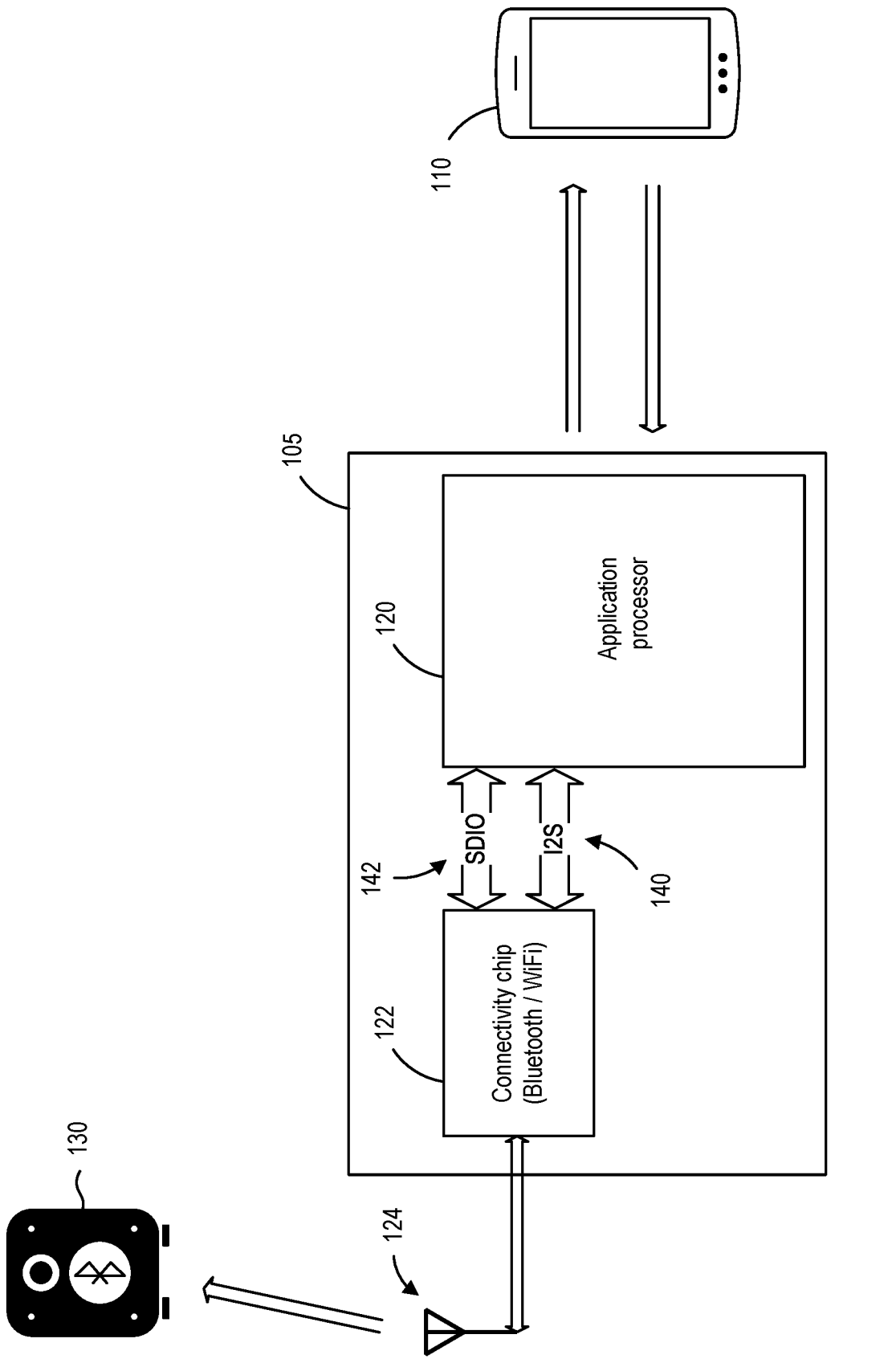
FIG. 1 illustrates a home automation hub utilized with a Bluetooth speaker according to examples of the present disclosure.

FIG. 1 illustrates a device, also referred to as a home automation hub, utilized with a Bluetooth speaker according to examples of the present disclosure. In the illustrated embodiment, the home automation hub 105, which includes application processor 120 and Bluetooth/Wi-Fi connectivity chip 122, can be paired to the Bluetooth speaker 130, which communicates with the home automation hub through antenna 124. The home automation hub can also be paired to phone 110. As illustrated in FIG. 1, the home automation hub does not include an internal speaker, but utilizes the Bluetooth speaker to enable audio output from the home automation hub. In an exemplary use case, audio data is streamed from the home automation hub to the Bluetooth speaker using the Bluetooth protocol. In this use case, the Inter-IC Sound (I2S, also referred to by the acronym I²S) bus 140 carries stereo audio data that can be streamed to the Bluetooth speaker via the Bluetooth/Wi-Fi connectivity chip 122.

More specifically, the I2S bus is an electrical serial bus interface standard used for connecting digital audio devices together. This bus is used to communicate pulse-code modulation (PCM) audio data between integrated circuits in an electronic device. The I2S bus separates clock and serial data signals, thereby resulting in a lower jitter than is typical of communications systems that recover the clock from the data stream. For instance, the I2S bus includes a line for two time-multiplexed data channels, a word select line, and a clock line, as further illustrated in the next figure. The word select lines indicates the channel being transmitted (e.g., WS=0 indicates the left channel and WS=1 indicates the right channel). The clock line carries the necessary clock signal. The specification of the I2S bus is defined in the "I2S bus specification," Philips Semiconductors. Jun. 5, 1996, the content of which is incorporated herein in its entirety by reference. The Secure Digital Input Output (SDIO) bus 142 is also illustrated in FIG. 1. The SDIO bus 142 is illustrated in FIG. 1 as an interface for the Bluetooth/Wi-Fi connectivity chip 122 and the application processor 120. SDIO bus 142 transmits commands and receives responses via a command line and moves data across a data line, utilizing a 1 bit mode and a 4 bit mode for data operation. All of the operations are synchronized via a SDIO clock over a clock line.

It should be noted that since the I2S bus is designed to only support a single, stereo audio stream, streaming of stereo audio data to the Bluetooth speaker is enabled, but simultaneous pairing of an additional device using the I2S bus is not enabled since this would result in the need for two connections/links. It should be appreciated that audio data can represent a single direction flow of data, for example, from a first device to a second device. For instance, audio data can be streamed from a phone paired with a Bluetooth speaker, representing a unidirectional data flow. Voice data can represent bidirectional data flow consisting of two audio streams, also referred to as communication links, one downstream and one upstream. Thus, in some implementations, voice streams are bidirectional while audio streams are unidirectional. However, embodiments of the present disclosure are not limited to this description of voice streams and audio streams. One of ordinary skill in the art would recognize many variations, modifications, and alternatives.

The Bluetooth/Wi-Fi connectivity chip 122, as well as other Bluetooth/Wi-Fi connectivity chips described herein, can be implemented as a Bluetooth connectivity chip providing Bluetooth functionality or a Bluetooth/Wi-Fi connectivity chip providing both Bluetooth and Wi-Fi communications functionality. As an example, embodiments of the present disclosure can utilize a CYW43353 single-chip 5G MAC/Baseband/Radio with Integrated Bluetooth 4.1 device available from Cypress Semiconductor Corporation of San Jose, California.

The CYW43353 single-chip device supports Bluetooth 4.1 with a baseband processor and a 2.4 GHz transceiver and includes two independent I2S digital audio ports. Each of the audio ports supports I2S signals including clock (SCK), word select (WS), data out (SDO), and data in (SDI). The WLAN section of the CYW43353 single-chip device includes a 32-bit processor with internal RAM and ROM, an integrated dual-band WLAN RF transceiver optimized for use in 2.4 GHz and 5 GHz Wireless LAN systems, and WLAN interfaces. The WLAN interfaces support a Secure Digital Input Output (SDIO) v3.0 interface for high speed 802.11ac connectivity while being also backward compatible with SDIO v2.0. The present disclosure is not limited to the 802.11ac protocol and other 802.11-based protocols, referred to as 802.11 protocols, are supported in other embodiments.

Moreover, other communication protocols, including LoRa internet of things (iot), Zigbee, narrow band internet of things (NB iot), and other protocols for wireless communications supporting different ranges and data transmission rates can be integrated into the Bluetooth connectivity chip or the Bluetooth/Wi-Fi connectivity chip.

Zigbee is a low-cost, low-power, wireless mesh network standard for controlling and monitoring applications. Zigbee delivers low-latency communication at 2.4 GHz frequency band and other frequencies, with a data rate of 250 kbit/s at the 2.4 GHz band. Zigbee builds on the physical layer and media access control defined in IEEE standard 802.15.4 for low-rate wireless personal area networks (WPANs). The specification includes four additional key components: network layer, application layer, Zigbee Device Objects (ZDOs) and manufacturer-defined application objects. ZDOs are responsible for some tasks, including keeping track of device roles, managing requests to join a network, as well as device discovery and security. The Zigbee network layer natively supports both star and tree networks, and generic mesh networking. Another feature of Zigbee builds on the security framework defined in IEEE 802.15.4 and supports secure communications, establishment and transport of cryptographic keys, cyphering frames, and device controls.

LoRa is a digital wireless data communication IoT technology that uses license-free sub-gigahertz radio frequency bands such as 915 MHz and that enables long range transmissions with low power consumption. The technology is defined in two parts: the physical layer LoRa PHY and the upper layers LoRaWAN. The LoRa physical layer protocol is closed and proprietary. LoRaWAN is a media access control (MAC) layer protocol for managing communication between LPWAN gateways and end-node devices, maintained by the LoRa Alliance. LoRaWAN defines the communication protocol and system architecture for the network, while the LoRa physical layer enables the long-range communication link. LoRaWAN is also responsible managing the communication frequencies, data rate, and power for all devices Narrow band internet of things (NB iot, also abbreviated as NB-IoT) is a Low Power Wide Area Network (LPWAN) radio technology standard that enables a wide range of devices and services to be connected using cellular telecommunications bands. This standard focuses specifically on indoor coverage, low cost, long battery life, and enables a large number of connected devices. The narrow band internet of things technology is deployed "in-band" in spectrum allocated to Long Term Evolution (LTE), using resource blocks within a normal LTE carrier (or in the unused resource blocks within a LTE carrier's guard band) or "standalone" for deployments in dedicated spectrum. It is also suitable for the reframing of GSM spectrum.

Thus, the use of the Bluetooth protocol as an example herein is not intended to limit the scope of the present disclosure, but only to provide an exemplary wireless communications protocol that can be utilized according to embodiments of the present disclosure. One of ordinary skill in the art would recognize many variations, modifications, and alternatives.

Figure 2:
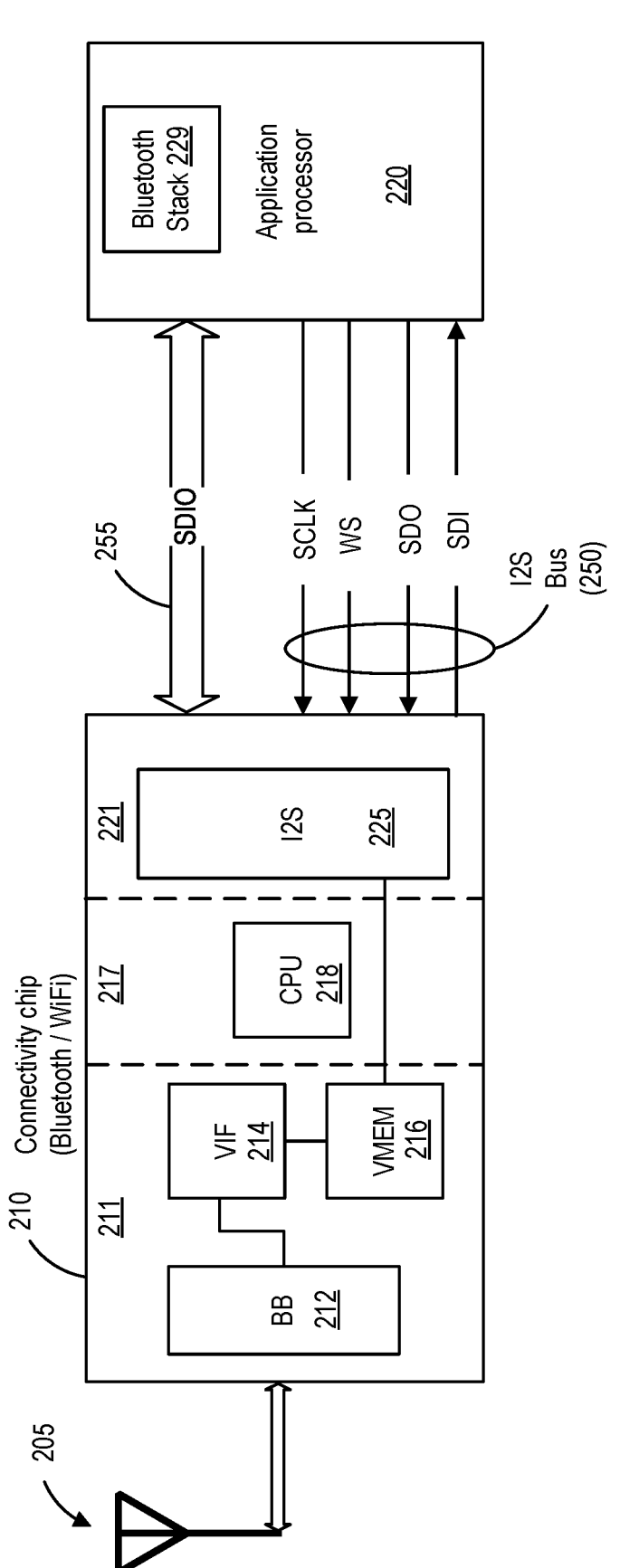
FIG. 2 illustrates a Bluetooth audio routing design according to examples of the present disclosure.

FIG. 2 illustrates a Bluetooth audio routing design according to examples of the present disclosure. Referring to FIG. 2, the control flow utilizing the application processor of the home automation hub is illustrated. Audio data received at antenna 205 is passed to the Bluetooth/Wi-Fi connectivity chip 210. The Bluetooth/Wi-Fi connectivity chip 210 includes a baseband processor 212, a voice interface 214, a voice memory 216, a CPU 218, and an I2S module 225. It will be evident to one of skill in the art that the Bluetooth/Wi-Fi connectivity chip includes other elements. However, for purposes of clarity, FIG. 2 illustrates elements that are utilized in the present disclosure and the description of the illustrated elements, including baseband processor 212, voice interface 214, voice memory 216, CPU 218, and I2S module 225 is not intended to limit the present disclosure, but only to provide exemplary elements for use in describing the various embodiments of the present disclosure.

The Bluetooth/Wi-Fi connectivity chip can be considered to include three functional sections, a central processing unit section 217, a Bluetooth hardware element section 211, and a chip-to-chip communications section 221. The central processing unit section 217 includes central processing unit 218, also referred as CPU 218. The central processing unit section 217 performs data processing and control operations, interacting with the Bluetooth hardware element section 211, described more fully below, and the chip-to-chip communications section 221, also described more fully below. Although in a physical implementation, the single Bluetooth/Wi-Fi connectivity chip includes the various elements that make up the three functional sections of the central processing unit section 217, the hardware element section 211, and the chip-to-chip communications section 221, it will be appreciated that the functionality provided by each of the functional sections is described herein as separate functions to explain and clarify the internal audio routing configuration that is utilized according to examples of the present disclosure. As described more fully herein, for example, with respect to FIG. 3, the central processing unit 218 included in the central processing unit section 217 of the Bluetooth/Wi-Fi connectivity chip interacts with the Bluetooth hardware elements section 211 to implement the internal audio routing enabled by embodiments of the present disclosure.

The Bluetooth hardware element section 211 performs Bluetooth-related operations for receiving, processing, and transmitting data, including audio data. As illustrated, the Bluetooth hardware element section 211 includes the baseband processor 212, the voice interface 214, and the voice memory 216. In an example, the baseband processor 212 implements time critical functions needed for Bluetooth operations. For instance, the baseband processor 212 manages the buffering, segmentation, and routing of data for all connections. For audio, the audio data is buffered in the voice memory 216. The baseband processor 212 also handles data flow control, schedules synchronous connection oriented (SCO) and asynchronous Connection-Less (ACL) transmit and receive (TX/RX) transactions, monitors Bluetooth slot usage, optimally segments and packages data into baseband packets, manages connection status indicators, and composes and decodes host controller interface (HCI) packets. The voice interface 214 supports a codec to encode and decode the audio data. This audio data is buffered in the voice memory 216. In addition, the Bluetooth hardware element section 211 can support different host controller interfaces including a pulse coded modulation (PCM) interface for the audio data in different formats. In an example, the PCM interface shares pins with an I2S interface of the I2S module 225 of the chip-to-chip communications section 221. Accordingly, audio data buffered in the voice memory 216 is sent to the I2S module 225 via these interfaces and audio data received from the I2S module 225 is buffered in the voice memory 216. In response to an audio input from the Bluetooth hardware element section 211 via the I2S interface, the I2S module 225 outputs audio data to the application processor 220 over an SDO data path. In response to an audio input from the application processor 220 over an SDI path, the I2S module 225 outputs audio data to the Bluetooth hardware element section 211 over the I2S interface.

As illustrated, audio data is passed from antenna 205 to the baseband processor 212. The voice interface 214 receives the audio data from the baseband processor 212 and passes the data to the voice memory 216. From voice memory 216, the data is passed to the I2S module 225, which communicates with the application processor 220. Referring to FIG. 2, two data communication buses provide communication paths between the Bluetooth/Wi-Fi connectivity chip 210 and the application processor 220, the SDIO bus 255 and the I2S bus 250. As illustrated, several signals are carried by the I2S bus 250 that provides the communication path between the Bluetooth/Wi-Fi connectivity chip 210 and the application processor 220, including a clock signal (SCLK), word select (WS), serial data in (SDI), and serial data out (SDO). The clock signal (SCLK) providing timing information for operation of the SDIO bus. The word select (WS) line indicates the channel being transmitted, for instance if WS=0, then channel 1 (e.g., left portion of a stereo signal) is being transmitted and if WS=1, then channel 2 (e.g., right portion of a stereo signal) is being transmitted. In some embodiments, the chip initialization message 310 discussed in relation to FIG. 3, also referred to as an SDIO chip initialization message, is transmitted using the SDIO protocol over the SDIO bus 255.

The SDIO bus is not typically utilized to carry voice data since latency characteristic of the SDIO protocol can impact the system performance. Moreover, the I2S protocol was not designed to carry two separate voice streams and, as a result, conventional Bluetooth connections may not be able to support two voice streams simultaneously. Referring to FIG. 2, the SDI and SDO signals are supported as unidirectional signals carried by the I2S bus, but not two voice streams. Accordingly, as illustrated in FIG. 2, downstream audio data received by the Bluetooth/Wi-Fi connectivity chip 210 would be sent over an I2S bus to the application processor in the home automation device. Simultaneously, upstream audio data from application processor would need to be sent back on the same I2S bus to the Bluetooth/Wi-Fi connectivity chip, then subsequently sent, via Bluetooth, to the connected Bluetooth speaker. In a similar manner, the audio received by the local microphone of the Bluetooth speaker, after being received by the Bluetooth/Wi-Fi connectivity chip, would need to be sent over the I2S bus to the application processor, then the application processor would need to send it back to the Bluetooth/Wi-Fi connectivity chip over the same I2S bus for eventual transmission to the user's phone via Bluetooth. Because of the limited ability of the SDIO protocol to support bidirectional data flow, provision of such bidirectional audio flow using the Bluetooth/Wi-Fi connectivity chip and a connected Bluetooth speaker has been limited or unavailable.

Figure 3:
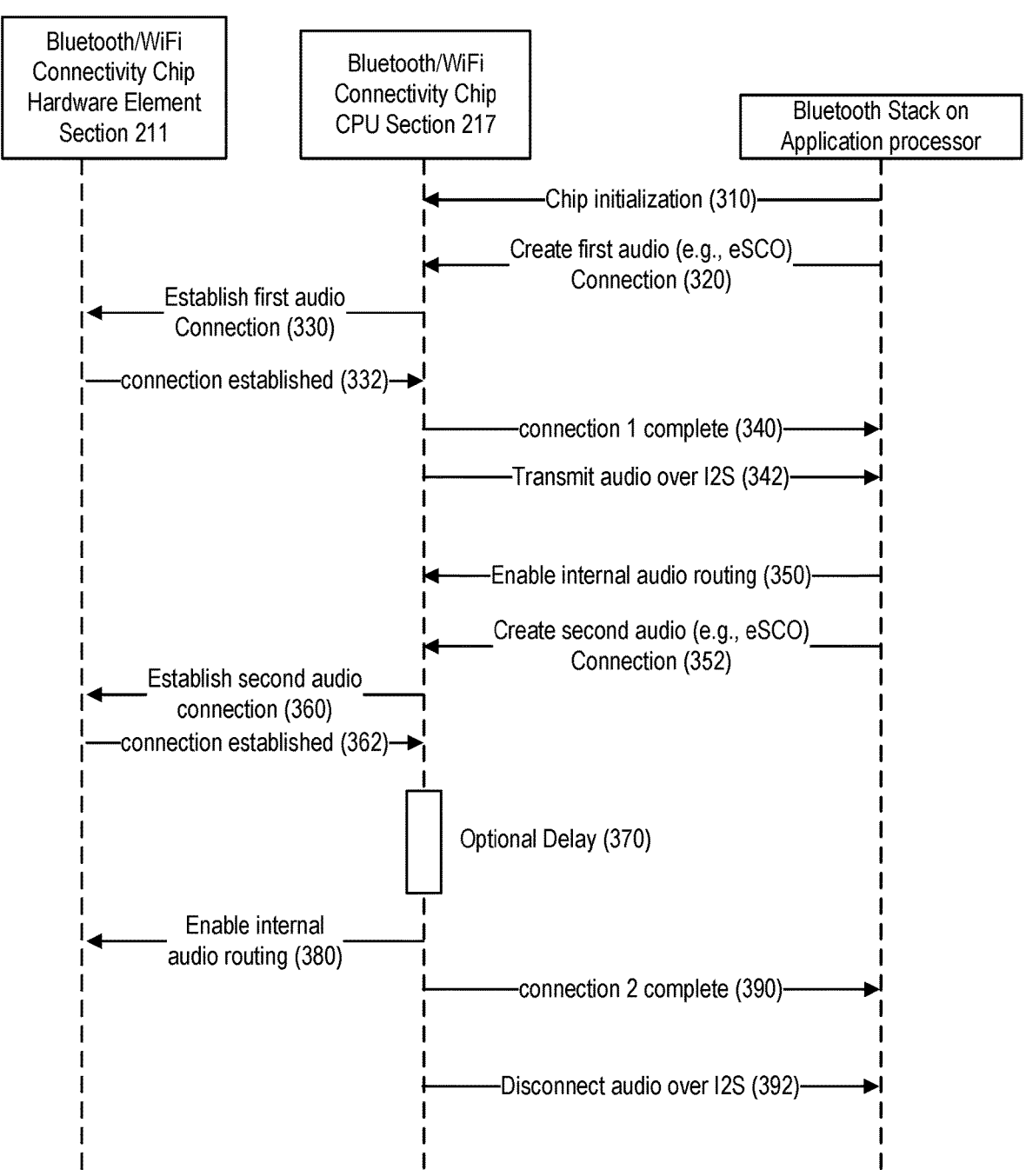
FIG. 3 illustrates a communication sequence diagram for establishing internal routing according to examples of the present disclosure.

FIG. 3 illustrates a communication sequence diagram for establishing internal routing according to examples of the present disclosure. As described more fully below, a software reconfiguration of the hardware of the Bluetooth/Wi-Fi connectivity chip can be performed to modify the routing of data internally, resulting in bidirectional communications using hardware that is typically only capable of supporting only a single voice channel. As described more fully in relation to FIG. 6, embodiments of the present disclosure utilize two unidirectional audio streams, which can be considered as two voice streams. These implementations contrast with conventional systems in which a single voice stream is provided.

Instead of routing audio data between the Bluetooth/Wi-Fi connectivity chip (also referred to as a Bluetooth device) and the application processor of the home automation hub through an Inter-IC Sound (I2S) bus (i.e., using an I2S module), the Bluetooth protocol stack on the application processor can instruct the Bluetooth/Wi-Fi connectivity chip to perform internal routing, which transfers the audio data utilizing two audio links provided inside the Bluetooth/Wi-Fi connectivity chip. As described herein, the CPU included in the Bluetooth/Wi-Fi connectivity chip is thus used to perform processing that is typically performed by the application processor. As will be evident to one of the skill in the art, the Bluetooth/Wi-Fi connectivity chip is operable to handle multiple communication protocols that can be implemented through operation of the CPU, other hardware elements, and software protocols. Processes, including modulation and demodulation of data and baseband processing can be performed using dedicated hardware elements on the Bluetooth/Wi-Fi connectivity chip, which is referred to as Bluetooth hardware, rather than by the CPU. Thus, these dedicated hardware elements can be configured and/or reconfigured to implement specific communication protocols on the Bluetooth/Wi-Fi connectivity chip that enable the internal audio routing described herein.

Referring to FIG. 3, the Bluetooth stack 229 on the application processor 220 transmits an initialization message to the CPU to the Bluetooth/Wi-Fi connectivity chip 210. As illustrated in FIG. 3, the initialization message 310, also referred to as a chip initialization message in reference to the Bluetooth/Wi-Fi connectivity chip 210, is transmitted from the Bluetooth stack of the application processor to the central processing unit section 217 of the Bluetooth/Wi-Fi connectivity chip 210. The initialization message is utilized to instruct the Bluetooth/Wi-Fi connectivity chip 210 to prepare for certain operations, including being ready to accept an incoming connection, being ready to respond incoming inquiry requests, or to enable/disable certain features. Once initialization is completed, connectivity is enabled for the performance of the functions described herein. As an example, the initialization message 310 is transmitted over the SDIO bus 255 in some embodiments. In other embodiments, the initialization message 310 can be transmitted over the I2S bus 250. The chip initialization message is typically transmitted at power up of the home automation hub.

Additionally, the Bluetooth stack transmits a message to create a first audio connection 320, which can be an enhanced Synchronous Connection Oriented (eSCO) channel in compliance with the Bluetooth protocol. As will be evident to one of skill in the art, a Synchronous Connection Oriented (SCO) channel or an eSCO channel is a type of radio link that can be used for communication of voice data. Devices connected using an SCO or eSCO link transmit encoded voice data in a reserved timeslot. The eSCO links are utilized in embodiments of the present disclosure since they provide increase flexibility in establishing communication links. For instance, in contract with an SCO link, which does not use retransmission, an eSCO link may use retransmissions and, thereby provide a higher level of reliability. Moreover an eSCO link can utilized a wider variety of packet types. Additionally, an eSCO link can sustain larger time intervals between packets than an SCO link, thereby increasing availability of time slots in comparison with an SCO link.

In response to receiving the message to create the first audio connection 320, the central processing unit of the central processing unit section 217 of the Bluetooth/Wi-Fi connectivity chip 210 transmits a message to establish the first audio connection 330 to the hardware element section 217 of the Bluetooth/Wi-Fi connectivity chip 210. As discussed above, the hardware element section 217 of the Bluetooth/Wi-Fi connectivity chip 210 includes one or more hardware elements such as the baseband processor 212, the voice interface 214, and the voice memory 216, discussed above in relation to the dedicated hardware elements. Once the first audio connection is established, a connection established message 332 is transmitted from the hardware element section 217 of the Bluetooth/Wi-Fi connectivity chip 210 to the central processing unit section 217 of the Bluetooth/Wi-Fi connectivity chip 210. Thus, this response or acknowledgement is received in response to the message to establish the first audio connection, confirming that the first audio connection has been established. The central processing unit of the central processing unit section 217 of the Bluetooth/Wi-Fi connectivity chip 210 then transmits the connection 1 complete message 340, which is a message transmitted from the central processing unit section 217 of the Bluetooth/Wi-Fi connectivity chip 210 to the Bluetooth stack of the application processor confirming that the first audio connection is complete. Once the first audio connection has been established between the hardware element section 217 of the Bluetooth/Wi-Fi connectivity chip 210 and the central processing unit section 217 of the Bluetooth/Wi-Fi connectivity chip 210, audio data can be transmitted from the Bluetooth chip over the I2S bus as illustrated in reference to FIG. 2.

It should be noted that the connection 1 complete message 340, confirming the establishment of the first audio connection 330, represents a first voice communications link, providing two audio channels for audio communications in an embodiment. The first voice communications link, which can be bidirectional, can also be referred to as a first voice link or a first voice channel, representing a communications link suitable for carrying a call.

Referring once again to FIG. 3, in order to enable the internal audio routing provided by embodiments of the present disclosure, a message to enable internal audio routing 350 is transmitted from the Bluetooth stack of the application processor to the central processing unit section 217 of the Bluetooth/Wi-Fi connectivity chip 210. This message to enable internal audio routing 350 will result in reconfiguration of the hardware element section 211 and the central processing unit section 217 of the Bluetooth/Wi-Fi connectivity chip 210 such that the voice memory of the hardware element section 211 communicates with CPU 218 of the central processing unit section 217 of the Bluetooth/Wi-Fi connectivity chip 210, rather than the I2S module 225 of the Bluetooth/Wi-Fi connectivity chip, as described more fully below in relation to FIG. 4. The reconfiguration of the hardware element section 211 and the central processing unit section 217 of the Bluetooth/Wi-Fi connectivity chip 210 enables internal routing of audio streams, thereby removing limitations presented by the limited nature of the I2S bus as described above, particularly the fact that the I2S bus is designed to only support a single, stereo audio stream, thereby preventing simultaneous pairing of two devices, for example, a phone and a Bluetooth speaker to the home automation hub while communicating through the I2S bus.

Referring to FIG. 3, a message to create a second audio connection 352 is transmitted from the Bluetooth stack of the application processor to the central processing unit section 217 of the Bluetooth/Wi-Fi connectivity chip 210. As discussed in relation to the first audio connection, the second audio connection can be an eSCO channel.

In response to receiving the message to create the second audio connection 352, the central processing unit of the central processing unit section 217 of the Bluetooth/Wi-Fi connectivity chip 210 transmits a message to establish the second audio connection 360 to the hardware element section 217 of the Bluetooth/Wi-Fi connectivity chip 210. As discussed above, the hardware element section 217 of the Bluetooth/Wi-Fi connectivity chip 210 includes one or more hardware elements such as the baseband processor 212, the voice interface 214, and the voice memory 216, discussed above in relation to the dedicated hardware elements. Once the second audio connection is established, a connection established message 362 is transmitted from the hardware element section 217 of the Bluetooth/Wi-Fi connectivity chip 210 to the central processing unit section 217 of the Bluetooth/Wi-Fi connectivity chip 210. Thus, this response or acknowledgement is received in response to the message to establish the second audio connection, confirming that the second audio connection has been established.

A delay, illustrated as optional delay 370 in FIG. 3, can be implemented to provide a predetermined time period during which the configuration of the internal audio routing in the Bluetooth/Wi-Fi connectivity chip is implemented in response to the transmission of the establish second audio connection message 360 from the Bluetooth/Wi-Fi connectivity chip central processing unit section 217 of the Bluetooth/Wi-Fi connectivity chip 210 to the hardware element section 211 of the Bluetooth/Wi-Fi connectivity chip 210. As an example of the optional delay 370 illustrated in FIG. 3 between the transmission of the connection established message 362 from the Bluetooth/Wi-Fi connectivity chip hardware element section 211 to the Bluetooth/Wi-Fi connectivity chip central processing unit section 217 and the enable internal audio routing message 380 that is transmitted from the Bluetooth/Wi-Fi connectivity chip central processing unit section 217 to the Bluetooth/Wi-Fi connectivity chip hardware element section 211, a delay of several milliseconds, for example 1 ms, 1.5 ms, 2 ms, 2.5 ms, 3 ms, 3.5 ms, 4 ms, 4.5 ms, or the like can be implemented.

After the optional delay 370, the central processing unit of the central processing unit section 217 of the Bluetooth/Wi-Fi connectivity chip 210 then transmits the connection 2 complete message 390, which is a message transmitted from the central processing unit section 217 of the Bluetooth/Wi-Fi connectivity chip 210 to the Bluetooth stack of the application processor confirming that the second audio connection is complete. Once the second audio connection has been established between the hardware element section 217 of the Bluetooth/Wi-Fi connectivity chip 210 and the central processing unit section 217 of the Bluetooth/Wi-Fi connectivity chip 210, audio data can be internally routed in the Bluetooth/Wi-Fi connectivity chip as described herein.

It should be noted that the connection 2 complete message 390, confirming the establishment of the second audio connection 360, represents a second voice communications link, providing two additional audio channels for audio communications in addition to the two audio channels provided by the first voice communications link. The second voice communications link, which can be bidirectional, can also be referred to as a second voice link or a second voice channel, representing an additional communications link suitable for carrying a voice call.

Although not illustrated in FIG. 3, in some embodiments, a second optional delay is implemented after the enable internal audio routing message 380 is transmitted from the central processing section 217 of the Bluetooth/Wi-Fi connectivity chip 210 to the hardware element section 211 of the Bluetooth/Wi-Fi connectivity chip 210. This second optional delay can be utilized to enable time for the internal routing to be implemented, including hardware configuration and/or reconfiguration, configuration of data paths, and the like. Thus, in some embodiments, to provide a delay in which to complete the internal routing hardware configuration, a predetermined delay is inserted after the enable internal audio routing message 380 is transmitted from the central processing section 217 of the Bluetooth/Wi-Fi connectivity chip 210 to the hardware element section 211 of the Bluetooth/Wi-Fi connectivity chip 210. Thus, in addition to software configuration, hardware configuration is implemented as an element of the internal routing configuration.

Referring to FIG. 3, once the central processing section 217 of the Bluetooth/Wi-Fi connectivity chip 210 transmits the message to the Bluetooth stack of the application processor confirming that the second audio connection is complete (i.e., connection 2 complete message 390), since the audio channels for both the first audio communication link and the second audio communication link are now routed internally in the Bluetooth/Wi-Fi connectivity chip, the establishment of the second connection enables the communication path to be shifted away from the I2S bus. As a result, in FIG. 5, the I2S bus is illustrated as optional since the audio is routed internally in the Bluetooth/Wi-Fi connectivity chip. Thus, FIG. 3 illustrates an embodiment in which the first audio connection established in response to the establish first audio connection message 330 utilizes the I2S bus to provide communications. Once the second audio connections is established in response to the establish second audio connection message 360, two audio communication links are present and the I2S bus can be disconnected or disabled, which is represented by the disconnect audio over I2S message 392 in FIG. 3.

In the illustrated embodiment, the connection 2 complete message 390 follows the enable internal audio routing message 350 from the Bluetooth stack of the application processor and the enable internal audio routing message 380 from the Bluetooth/Wi-Fi connectivity chip central processing unit section 217 to the Bluetooth/Wi-Fi connectivity chip hardware element section 211. A delay, illustrated as optional delay 370 in FIG. 3, can be implemented to provide a predetermined time period during which the configuration of the internal audio routing in the Bluetooth/Wi-Fi connectivity chip is implemented in response to the transmission of the enable internal audio routing message 350 from the Bluetooth stack on the application processor to the Bluetooth/Wi-Fi connectivity chip central processing unit section 217.

As an example of the optional delay 370 illustrated in FIG. 3 between the transmission of the connection established message 362 from the Bluetooth/Wi-Fi connectivity chip hardware element section 211 to the Bluetooth/Wi-Fi connectivity chip central processing unit section 217 and the enable internal audio routing message 360 that is transmitted from the Bluetooth/Wi-Fi connectivity chip central processing unit section 217 to the Bluetooth/Wi-Fi connectivity chip hardware element section 211, a delay of several milliseconds, for example 1 ms, 1.5 ms, 2 ms, 2.5 ms, 3 ms, 3.5 ms, 4 ms, 4.5 ms, or the like can be implemented.

In some embodiments, the message order illustrated in FIG. 3 is modified such that the optional delay 370 is utilized after the enable internal audio routing message 380 is transmitted from the Bluetooth/Wi-Fi connectivity chip central processing unit section 217 to the Bluetooth/Wi-Fi connectivity chip hardware element section 211 and prior to the connection 2 complete message 390 is transmitted from the Bluetooth/Wi-Fi connectivity chip central processing unit section 217 to the Bluetooth stack on the application processor. In other embodiments, in addition to optional delay 370, one or more additional delays are inserted as appropriate to the particular application. For example, in one embodiment, in addition to optional delay 370 that is utilized between the transmission of the connection established message 362 from the Bluetooth/Wi-Fi connectivity chip hardware element section 211 and the Bluetooth/Wi-Fi connectivity chip central processing unit section 217 and the transmission of the enable internal audio routing message 380 from the Bluetooth/Wi-Fi connectivity chip central processing unit section 217 to the Bluetooth/Wi-Fi connectivity chip hardware element section 211, an additional delay is utilized after the enable internal audio routing message 380 is transmitted from the Bluetooth/Wi-Fi connectivity chip central processing unit section 217 to the Bluetooth/Wi-Fi connectivity chip hardware element section 211 and prior to the connection 2 complete message 390 is transmitted from the Bluetooth/Wi-Fi connectivity chip central processing unit section 217 to the Bluetooth stack on the application processor. One of ordinary skill in the art would recognize many variations, modifications, and alternatives.

It should be appreciated that the particular message order illustrated in FIG. 3 is not required by the present disclosure and other message orders can be utilized according to examples of the present disclosure. As an example, the connection 2 complete message (390) can be transmitted from the Bluetooth/Wi-Fi connectivity chip central processing unit section 217 to the Bluetooth stack on the application processor after the connection established (362) message is transmitted from the Bluetooth/Wi-Fi connectivity chip hardware element section 211 to the Bluetooth/Wi-Fi connectivity chip central processing unit section 217 and prior to the optional delay 370 and the transmission of the enable internal audio routing message 380 from the Bluetooth/Wi-Fi connectivity chip central processing unit section 217 to the Bluetooth/Wi-Fi connectivity chip hardware element section 211. As will be evident to one of skill in the art, the timing and delay between messages is determined in accordance with design rules that will prevent conflicts from occurring in the various hardware elements as the configuration is established to enable the two audio connections that are routed internally inside the Bluetooth/Wi-Fi connectivity chip 410. Thus, as described herein, the message order and the delays between messages are selected to allow the various hardware elements time to implement the internal audio routing configuration described herein.

Figure 4:
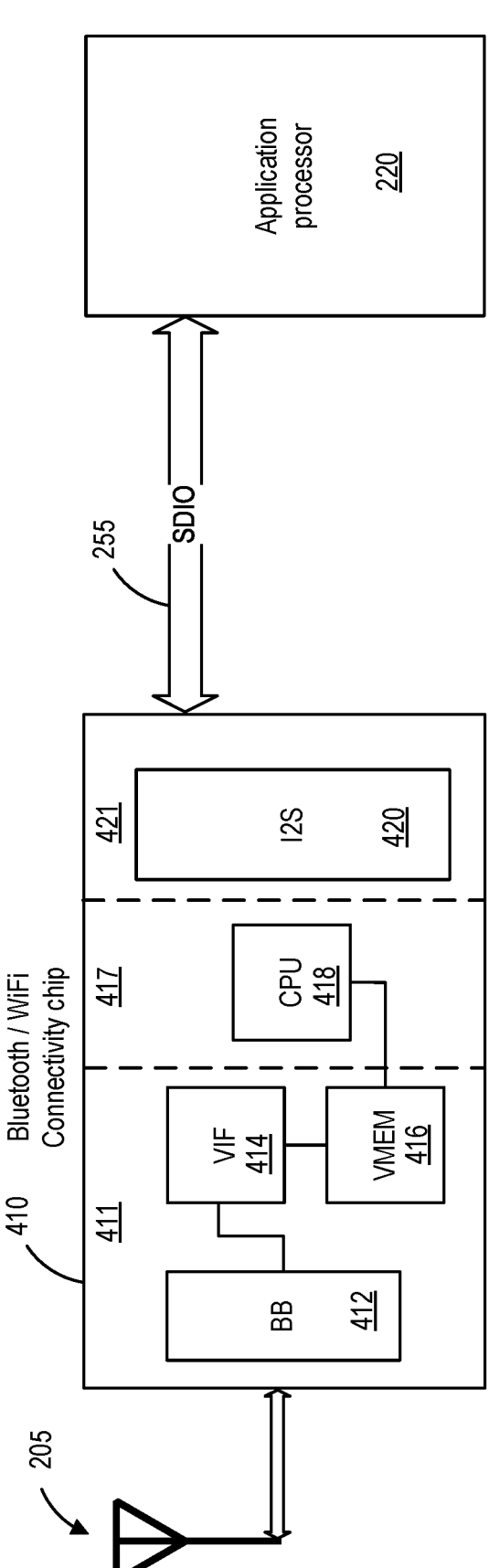
FIG. 4 illustrates an internal Bluetooth audio routing design according to examples of the present disclosure.

In comparison with the communication links illustrated by I2S communications link 140 in FIG. 1, which provides for communication between the Bluetooth/Wi-Fi connectivity chip 122 and application processor 120, thereby enabling a single bidirectional communication link with phone 110 and the home automation hub 105, embodiments of the present disclosure, as illustrated in FIG. 4, do not utilize the I2S bus 250. In other words, the voice communications links are routed internally in the Bluetooth/Wi-Fi connectivity chip 410 as illustrated in FIG. 4, described more fully below. Accordingly, once the second audio connection is established in response to the establish second audio connections message 360 from the Bluetooth/Wi-Fi connectivity chip central processing unit section 217 to the Bluetooth/Wi-Fi connectivity chip hardware element section 211 and the connection 2 complete message 390 is transmitted to the Bluetooth stack on the application processor from the Bluetooth/Wi-Fi connectivity chip central processing unit section 217, the disconnect audio over I2S message 392 can be transmitted from the Bluetooth/Wi-Fi connectivity chip central processing unit section 217 to the Bluetooth stack on the application processor. This indication that internal routing of the communications internally in the Bluetooth/Wi-Fi connectivity chip is optional, i.e., the disconnect audio over I2S message 392 transmitted from the Bluetooth/Wi-Fi connectivity chip central processing unit section 217 to the Bluetooth stack of the application processor is optional in some embodiments since it can be inferred from the connection 2 complete message 390 transmitted from the Bluetooth/Wi-Fi connectivity chip central processing unit section 217 to the Bluetooth stack of the application processor that internal audio routing inside the Bluetooth/Wi-Fi connectivity chip has been implemented and communication through the I2S bus can be disabled.

In an alternative embodiment of the present disclosure, the enable internal audio routing message 350 transmitted from the Bluetooth stack on the application processor to the Bluetooth/Wi-Fi connectivity chip central processing unit section 217 is transmitted after the chip initialization message 310 is transmitted from the Bluetooth stack on the application processor to the Bluetooth/Wi-Fi connectivity chip central processing unit section 217. As described below, in this alternative embodiment, rather than establishing a first communication link utilizing the I2S bus, the first communication link is an internal audio communication link that is internally routed inside the Bluetooth/Wi-Fi connectivity chip 410.

In this alternative embodiment, and referring to FIG. 3, the create first audio connection message 320 from the Bluetooth stack of the application processor to the Bluetooth/Wi-Fi connectivity chip central processing unit section 217 results in the transmission of the establish first audio connection message 330 from the Bluetooth/Wi-Fi connectivity chip central processing unit section 217 to the Bluetooth/Wi-Fi connectivity chip hardware element section 211. The establish first audio connection message 330 can be utilized to establish communication link 1 502 illustrated in FIG. 5 and communication link 1 602 in FIG. 6, which is an internal audio connection internal to the Bluetooth/Wi-Fi connectivity chip 410. As described more fully in relation to FIG. 5, this first audio communication link (i.e., communication link 1 502) can be utilized to provide a downstream audio channel (i.e., downstream from phone 510 to Bluetooth speaker 530 in FIG. 5), that is routed internally in the Bluetooth/Wi-Fi connectivity chip 410 and independent of the I2S communication link, which is illustrated as optional in FIG. 5.

Figure 5:
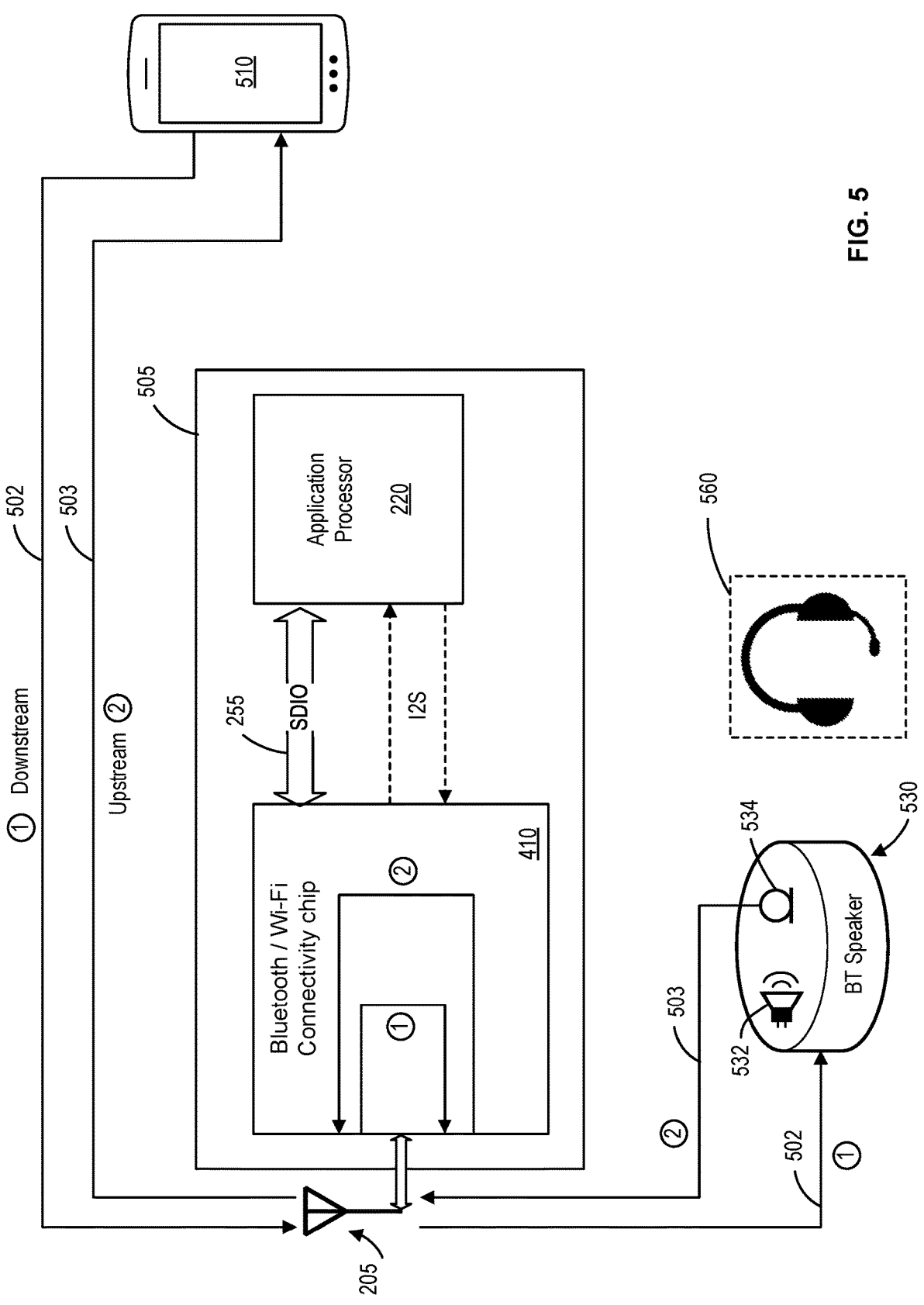
FIG. 5 illustrates audio data flow using internal Bluetooth audio routing according to examples of the present disclosure.

In this alternative embodiment, in response to the establish first audio connection message 330 that is transmitted from the Bluetooth/Wi-Fi connectivity chip central processing unit section 217 to the Bluetooth/Wi-Fi connectivity chip hardware element section 211, communication link 1 502 is established as the first audio communication link. As illustrated in FIG. 5 by communication link 1 502 and downstream link 1 602 in FIG. 6, this first communication link in this alternative embodiment is routed internally inside the Bluetooth/Wi-Fi connectivity chip 410, thereby providing internal audio routing in the Bluetooth/Wi-Fi connectivity chip 410 independent of the I2S communication link 140 illustrated in FIG. 1. In this alternative embodiment, the connection established message 332 that is transmitted from the Bluetooth/Wi-Fi connectivity chip hardware element section 211 to the Bluetooth/Wi-Fi connectivity chip central processing unit section 217 and the connection 1 complete message 340 that is transmitted from the Bluetooth/Wi-Fi connectivity chip central processing unit section 217 to the Bluetooth stack of the application processor indicates the establishment of communication link 1 502 illustrated in FIG. 5 and communication link 1 602 in FIG. 6. In this alternative embodiment, the transmit audio over I2S 342 is omitted since the first audio connection is routed internally in the Bluetooth/Wi-Fi connectivity chip 410 and not over the I2S bus as discussed in relation to FIG. 2.

Referring once again to FIG. 3, the create second audio connection message 352 transmitted from the Bluetooth stack on the application processor to the Bluetooth/Wi-Fi connectivity chip central processing unit section 217 results in the establish second audio connection message 360 being transmitted from the Bluetooth/Wi-Fi connectivity chip central processing unit section 217 to the Bluetooth/Wi-Fi connectivity chip hardware element section 211. This establish second audio connection message 360 is utilized in this alternative embodiment to establish communication link 2 503 illustrated in FIG. 5 and communication link 2 603 in FIG. 6, which is an internal audio connection internal to the Bluetooth/Wi-Fi connectivity chip 410. As described more fully in relation to FIG. 5, this second audio communication link (i.e., communication link 2 503) can be utilized to provide an upstream audio channel (i.e., upstream from Bluetooth speaker 530 to phone 510 in FIG. 5), that is routed internally in the Bluetooth/Wi-Fi connectivity chip 410 and independent of the I2S communication link, which is illustrated as optional in FIG. 5. In this alternative embodiment, in response to the establish second audio connection message 360 from the Bluetooth/Wi-Fi connectivity chip central processing unit section 217 to the Bluetooth/Wi-Fi connectivity chip hardware element section 211, the communication link 2 503 is established as the second audio communication link. As illustrated in FIG. 5 by communication link 2 503 and upstream link 2 603 in FIG. 6, this second communication link in this alternative embodiment is routed internally inside the Bluetooth/Wi-Fi connectivity chip 410, thereby providing internal audio routing in the Bluetooth/Wi-Fi connectivity chip 410 independent of the I2S communication link 140 illustrated in FIG. 1. In this alternative embodiment, the connection 2 complete message 390 indicates the establishment of communication link 2 503 illustrated in FIG. 5 and communication link 2 603 in FIG. 6. In this alternative embodiment, the disconnect audio over I2S message 392 is omitted since no I2S communication is utilized. In other embodiments, the disconnect audio over I2S message 392 is sent from the Bluetooth application processor to the Bluetooth/Wi-Fi connectivity chip central processing unit section 217 before the enable internal audio routing message 350 is transmitted from the Bluetooth stack on the application processor to the Bluetooth/Wi-Fi connectivity chip central processing unit section 217 in order to disconnect the I2S communication link, which may be established in accordance with conventional approaches, for, example, after the chip initialization message 310 is transmitted from the Bluetooth stack on the application processor to the Bluetooth/Wi-Fi connectivity chip central processing unit section 217.

FIG. 4 illustrates an internal Bluetooth audio routing design according to examples of the present disclosure. Referring to FIG. 4, the control flow that enables bidirectional voice data flow is illustrated. As will be evident to one of skill in the art, this control flow can be enabled by utilization of a software feature of the Bluetooth/Wi-Fi connectivity chip 410. In some embodiments, no hardware change is required with respect to the configurations illustrated in FIG. 2, simplifying system implementation and enabling implementation with legacy systems. As described more fully below, routing of the audio data to the CPU 418 rather than the I2S module 420, also referred to as internal routing utilizing the hardware interface of the Bluetooth/Wi-Fi connectivity chip 410, enables bidirectional voice data communication.

As described above in relation to FIG. 2, the Bluetooth/Wi-Fi connectivity chip 410 can be considered to include three functional sections, a central processing unit section 417, a Bluetooth hardware element section 411, and a chip-to-chip communications section 421. The central processing unit section 417 includes central processing unit 418, also referred as CPU 418. The central processing unit section 417 performs data processing and control operations, interacting with the Bluetooth hardware element section 411 and the chip-to-chip communications section 421. Although in a physical implementation, the single Bluetooth/Wi-Fi connectivity chip includes the various elements that make up the three functional sections of the central processing unit section 417, the hardware element section 411, and the chip-to-chip communications section 421, it will be appreciated that the functionality provided by each of the functional sections is described herein as separate functions to explain and clarify the internal audio routing configuration that is utilized according to examples of the present disclosure. As described above, the central processing unit 418 included in the central processing unit section 417 of the Bluetooth/Wi-Fi connectivity chip interacts with the Bluetooth hardware elements section 411 to implement the internal audio routing enabled by embodiments of the present disclosure.

Audio data received at antenna 205 is passed to the baseband processor 412. The baseband processor 412 performs functions, including serialization/deserialization and decoding/encoding of the audio data received by the Bluetooth/Wi-Fi connectivity chip in order to provide a serialized and decoded digital stream that is input to voice interface 414. In some embodiments, one or more of the functions described in relation to the baseband processor 412 can be implemented by voice interface 414, described more fully below. For example, in an embodiment, serialization of the audio data received by the Bluetooth/Wi-Fi connectivity chip can be performed by the baseband processor 412, but not decoding. In this example, the data in an encoded format can be stored in the one or more memories illustrated by voice memory 416. Thus, the voice memory 416 can store either decoded data or encoded data depending on the particular implementation.

The voice interface 414 receives the serialized and decoded digital stream, also referred to as voice data, from the baseband processor 412 and passes the data to the voice memory 416. The voice interface 414 supports a codec to encode and decode the voice data. In an example, the encoding and decoding uses Continuously variable slope delta modulation (CVSD) coded or a Bluetooth modified subband coding (mSBC) codec. The voice data is buffered in the voice memory 416. Voice data in and out of the voice memory 416 are not routed to the I2S module 420 via PCM and I2S interfaces. Instead, the CPU 418 performs memory reads and writes to access the voice data in the voice memory 416. Accordingly, voice data buffered in the voice memory 416 is read by the CPU 418 for processing. In response to an audio input from the Bluetooth hardware element section, the CPU 418 outputs voice data from the voice memory 216 to the Bluetooth stack on the application processor over an SDO data path. In response to an audio input from the Bluetooth stack on the application processor, the CPU 418 outputs voice data to the voice memory 416.

The voice interface 414 functions to convert the constant stream of data received by the baseband processor 412 to blocks of data having a discrete size, suitable for storage in the voice memory, discussed more fully below. Thus, in order to prevent damage to the received voice data, for example, overwriting of data, the voice interface 414 converts the stream of incoming data into a discrete data format that can be stored in memory.

Rather than passing the data to the I2S module 420, which would then communicate the data to the application processor using the I2S bus connected to the I2S module 420 in the chip-to-chip communications section 421, the data is passed to the CPU 418 in the central processing unit section 417 of the Bluetooth/Wi-Fi connectivity chip 410 for processing. Accordingly, the limitations that are associated with the use of the I2S bus to communicate with the application processor 220 can be reduced or eliminated. Additional details related to the internal Bluetooth audio routing are described herein.

It will be noted that in FIG. 4, the SDIO bus 255 illustrated in both FIG. 2 and FIG. 4 is present, providing a communication path between the chip-to-chip communications section 421 of the Bluetooth/Wi-Fi connectivity chip 410 and the application processor 220. However, the I2S bus 250 illustrated in FIG. 2 is removed since embodiments of the present disclosure utilize CPU 418 in the central processing unit section 417 of the Bluetooth/Wi-Fi connectivity chip 410 to process data that would typically be processed using the application processor 220. Accordingly, rather than transmitting data between the Bluetooth/Wi-Fi connectivity chip 410 and the application processor through the I2S bus, internal routing of the data flow inside the Bluetooth/Wi-Fi connectivity chip 410 is utilized as described herein. As discussed in relation to FIG. 2, the I2S bus does not support multiple voice channels or streams, but only a single voice channel. Accordingly, shortcomings resulting from the limited capabilities of the I2S bus are overcome by the use of the internal audio routing implementation provided by embodiments of the present disclosure.

FIG. 5 illustrates audio data flow using internal Bluetooth audio routing according to examples of the present disclosure. In a conventional streaming implementation, a phone, for example, phone 510, can be paired to a Bluetooth speaker, for example, Bluetooth speaker 530. Audio data stored in the phone can be streamed to the Bluetooth speaker and broadcast using internal speaker 532 of Bluetooth speaker 530. Alternatively, the phone, for example, phone 510, can be paired to the home automation hub 505. However, if the home automation hub does not include an internal speaker, the limitations inherent in the use of the I2S bus will prevent the home automation hub 505 from being paired with both the phone, for example, phone 510, and the Bluetooth speaker, for example, Bluetooth speaker 530. As a result, hands free calling utilizing phone 510, home automation hub 505, and Bluetooth speaker 530 is not available using conventional approaches based on communication through the I2S bus. In other words, since multiple Bluetooth devices cannot be paired to the home automation hub 505 and multiple data streams cannot be supported by the I2S bus, it is not possible to perform hands free calling utilizing phone 510, home automation hub 505, and Bluetooth speaker 530 using conventional techniques. It should be noted that if the home automation hub 505 included a wired, internal speaker, Bluetooth pairing between the phone and the Bluetooth speaker could be utilized to implement hands free calling. However, in the use case in which the home automation hub 505 does not include an internal speaker, thereby introducing the need to pair a second device (i.e., a Bluetooth speaker) to the home automation hub 505, the hands free calling functionality discussed above is not available using conventional techniques.

Referring to FIG. 5, phone 510 and Bluetooth speaker 530 are paired to the home automation hub 505, which includes the Bluetooth/Wi-Fi connectivity chip 410 utilizing internal Bluetooth audio routing as discussed in relation to FIG. 4. As illustrated in FIG. 5, first audio data is transmitted from phone 510 to home automation hub 505. This first audio data can be referred to as downstream audio data and is communicated using a first audio data link 502 that is illustrated by a circled number 1. The first audio data is received at the home automation hub using antenna 205. As discussed in relation to FIGS. 3 and 4, the first audio data is internally routed in the Bluetooth/Wi-Fi connectivity chip 410 and retransmitted to Bluetooth speaker 530 for broadcast by local speaker 532 as shown in FIG. 5. The internal audio routing, represented by the circled number 1 inside the Bluetooth/Wi-Fi connectivity chip 410, includes routing through baseband module 412, voice interface 414, voice memory 416 present in the hardware element section 411 of the Bluetooth/Wi-Fi connectivity chip 410, and CPU 418 present in the central processing unit section 417 of the Bluetooth/Wi-Fi connectivity chip 410. Additional details related to the internal audio routing represented by the circled number 1 inside the Bluetooth/Wi-Fi connectivity chip 410 is provided in relation to FIGS. 6-9 below.

A response, which is referred to as second audio data, is received using local microphone 534 of Bluetooth speaker 530. This second audio data can be referred to as upstream audio data and is communicated using a second audio link 503 that is illustrated by a circled number 2. The second audio data is transmitted from the Bluetooth speaker 530 to the home automation hub 505 over the second audio link 503 and received using antenna 205. At the Bluetooth/Wi-Fi connectivity chip 410, internal routing is performed, illustrated by the circled number 2 inside the Bluetooth/Wi-Fi connectivity chip 410. This second audio data is then transmitted from the home automation hub 505 to phone 510 using the second audio link 503. Accordingly, hands free operation is provided since the audio data received at the phone is produced using local speaker 532 in Bluetooth speaker 530 and the response received using local microphone 534 of Bluetooth speaker 530 is delivered to the network through the phone.

It should be noted that home automation hub 505 in this embodiment does not include an internal speaker, but utilizes the Bluetooth speaker to generate audio output through local speaker 532 and receive audio input through local microphone 534. As a result, during hands free operation, the speaker and microphone of phone 510 are not utilized. Additionally, the I2S bus in the home automation hub is illustrated as optional since the audio data is not routed into or out of the application processor using the I2S bus. Rather, the internal audio routing discussed in relation to FIGS. 6-9 is utilized to enable the operation provided by embodiments of the present disclosure.

It should be noted that in addition to Bluetooth speaker 530, other audio input/output devices can be paired to the home automation hub and provide hands free functionality. For example, a Bluetooth headset 560 (illustrated as optional) could be paired with the home automation hub in place of or in combination with the Bluetooth speaker 530. The headphones and microphone of the optional Bluetooth headset could then carry out the functionality described with respect to the local speaker 532 and the local microphone 534 of the Bluetooth speaker 530. Thus, although Bluetooth speaker 530 and Bluetooth headset 560 are illustrated in FIG. 5, embodiments of the present disclosure are not limited to these particular Bluetooth devices and other Bluetooth devices can be utilized as appropriate to the particular application. One of ordinary skill in the art would recognize many variations, modifications, and alternatives.

Figure 6:
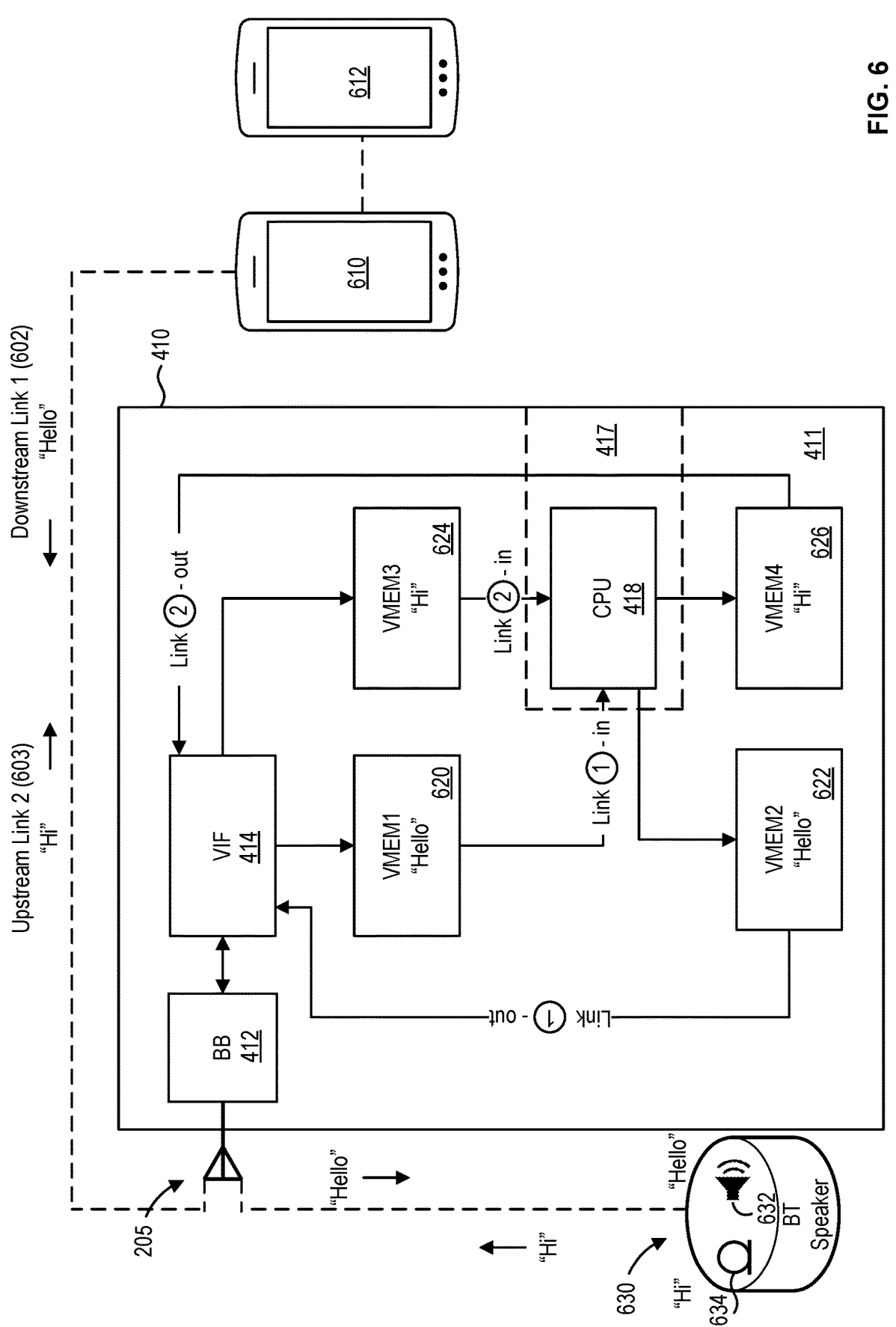
FIG. 6 is a functional diagram illustrating audio data flow using internal Bluetooth audio routing according to examples of the present disclosure.

FIG. 6 is a functional diagram illustrating audio data flow using internal Bluetooth audio routing according to examples of the present disclosure. The audio data flow illustrated in FIG. 6 enables hands free bidirectional communication using a Bluetooth speaker in conjunction with a phone and a home automation hub, where both the phone and the Bluetooth speaker are paired to a home automation hub that does not include an internal speaker. Thus, in the example embodiment illustrated in FIG. 6, phone 610 is used in a hands free mode in which local speaker 632 and local microphone 634 of Bluetooth speaker 630 are utilized to provide audio output and input for phone 610. Embodiments of the present disclosure provide internal Bluetooth audio routing to enable two Bluetooth audio links simultaneously or concurrently.

As illustrated in FIG. 6, downstream link 1 602 and upstream link 2 603 are unidirectional voice channels operating over a Bluetooth link. Downstream link 1 602 and upstream link 2 603 can be considered in a combined form in which they are combined to form a single, bi-direction voice channel operating over a single Bluetooth link. Thus, embodiments of the present disclosure establish two audio links that are internally routed in the Bluetooth/Wi-Fi chip, enabling two, concurrent unidirectional links, one from the phone to the speaker via the Bluetooth/Wi-Fi chip and the other from the microphone of the BT speaker to the phone via the Bluetooth/Wi-Fi chip. As a result, two audio links are provided via the home automation device, which supports two audio links, one connected to the phone and one connected to the Bluetooth speaker.

Referring to FIG. 6, phone 610, which can be conducting a call with phone 612 through a cellular network (not shown), transmits audio data to Bluetooth/Wi-Fi connectivity chip 410 using antenna 205. This data path is identified as a first communication channel (downstream link 1 602), which can also be referred to as Link 1. This data path can also be referred to as a downstream data path as the data is transmitted downstream from the phone to the Bluetooth speaker for broadcast through local speaker 632 of the Bluetooth speaker 630. As an example, the user of phone 612 may say "Hello" to the person using phone 610, which is operating in a hands free mode through home automation hub 505 and local speaker 632 and local microphone 634 of Bluetooth speaker 630. The audio data is transmitted from the phone to the Bluetooth speaker through the Bluetooth connection and is received by antenna 205.

As discussed in relation to FIG. 4, the Bluetooth/Wi-Fi connectivity chip 410 includes several functional sections including hardware element section 411 and central processing unit section 417, which are illustrated in FIG. 6. For ease of illustration and clarity, chip-to-chip communications section 421 is not illustrated in FIG. 6. The baseband unit 412 of the hardware element section 411 converts the received signal (Link 1) to a digital signal and passes the digitized audio data to the voice interface (VIF) 414 of the hardware element section 411. As discussed in relation to FIGS. 2 and 4, serialization of the received signal is typically performed by the baseband unit 412 although this process can alternatively be performed by the voice interface 414. Moreover, decoding of the serialized audio data can be performed by baseband unit 412 of hardware element section 411 or can be performed by one or more of the voice memory buffers described more fully below.

The digital audio data, also referred to as voice data, is stored in a memory illustrated as first voice memory buffer (VMEM1) 620 of hardware element section 411, for example, after conversion from byte format to a serial bit format. For this example, the word "Hello" is stored in first voice memory buffer (VMEM1) 620 and then delivered to the CPU 418 of the central processing unit section 417. The voice data provided to CPU 418 of the central processing unit section 417 from first voice memory buffer (VMEM1) 620 is illustrated as Link 1-input (Link 1-in) since this data is associated with the first audio data (Link 1) and is received as an input to CPU 418 of central processing unit section 417. It will be appreciated that VIF 414 operates in a streaming manner in which data is not stored. Thus, first voice memory buffer (VMEM1) 620 is utilized to capture and store a copy of a portion of the stream received at and transmitted by VIF 414.

CPU 418 of central processing unit section 417 provides a copy of the digital audio data (e.g., "Hello") to second voice memory buffer (VMEM2) 622 for storage and eventual delivery and broadcast of the audio data by local speaker 632 of Bluetooth speaker 630. In some embodiments, CPU 418 can perform transcoding in cases where the format in which the data stored in first voice memory buffer (VMEM1) 620 differs from the format in which the data is stored in second voice memory buffer (VMEM2) 622. Similarly, CPU 418 can perform transcoding in cases where the format in which the data stored in third voice memory buffer (VMEM3) 624 differs from the format in which the data is stored in fourth voice memory buffer (VMEM4) 626. The ability to implement this transcoding will enable operation of the internal routing process across a wider variety of devices since differing data formats are enabled.

As illustrated in FIG. 6, the copy of the digital audio data is delivered from second voice memory buffer (VMEM2) 622 to VIF 414 as Link 1-output (Link 1-out), since this data is associated with the first audio data (Link 1) and is received as an output of CPU 418 of central processing unit section 417 after storage in second voice memory buffer (VMEM2) 622. After processing by VIF 414, the copy of the digital audio data is passed to the baseband module 412 for further processing. As discussed above, deserialization and encoding of the voice data can be performed by VIF 414 and/or baseband module 412. After processing by baseband module 412, the audio data is transmitted through antenna 205 to Bluetooth speaker 630 and broadcast through local speaker 632 of Bluetooth speaker 630. Thus, the audio data represented by the word "Hello" that was originally received at phone 610 is produced using the Bluetooth speaker. As illustrated in FIG. 6, Link 1-in and Link 1-out represent two audio streams. Link 1-in, which would typically be directed to the application processor through the I2S bus, is redirected to CPU 418. Link 1-out connects second voice memory buffer (VMEM2) 622 and the Bluetooth speaker 630, providing a second audio stream. Accordingly, in the embodiment illustrated in FIG. 6, two unidirectional audio streams, which can be considered as a bidirectional voice stream are represented by Link 1-in and Link 1-out, providing a bidirectional connection between phone 610 and Bluetooth speaker 630.

In response to the broadcasting of "Hello" by local speaker 632 of Bluetooth speaker 630, the user of phone 610 can respond with the word "Hi" that is received by the local microphone 634 of Bluetooth speaker 630. This response is referred to as second audio data and the data path is identified as a second communication channel (upstream link 2 603), which can also be referred to as Link 2. In a manner similar to the downstream data path, this second communication channel can be referred to as an upstream data path as the data is transmitted upstream from the local microphone 634 of Bluetooth speaker 630 to the phone 610.

Referring to FIG. 6, the data path that will deliver the response "Hi" from the local microphone 634 of Bluetooth speaker 630 to phone 610 is thus be referred to as an upstream data path as the data is transmitted upstream from the Bluetooth speaker to the phone. In this example, the second audio data represented by the response "Hi" is transmitted through the Bluetooth connection between Bluetooth speaker 630 and home automation hub 505 and received by antenna 205. In a manner similar to that discussed in relation to receipt of the first audio data by Bluetooth/Wi-Fi connectivity chip 410, baseband unit 412 converts the received signal (Link 2) to a digital signal and passes the audio data associated with the response to voice interface (VIF) 414. As an example, serialization of the received signal (Link 2) can be performed by baseband unit 412 and decoding of the serialized digital data can be performed by VIF 414.

The digital audio data associated with the response, also referred to as voice data, is stored in third voice memory buffer (VMEM3) 624 of hardware element section 411, for example, after conversion from byte format to a serial bit format. For this example, the word "Hi," after storage in third voice memory buffer (VMEM3) 624, is delivered to the CPU 418 of the central processing unit section 417. The voice data provided to CPU 418 of the central processing unit section 417 from third voice memory buffer (VMEM3) 624 is illustrated as Link 2-input (Link 2-in) since this data is associated with the second audio data (Link 2) and is received as an input to CPU 418 of central processing unit section 417. It will be appreciated that VIF 414 operates in a streaming manner in which data is not stored. Thus, third voice memory buffer (VMEM3) 624 is utilized to capture and store a copy of a portion of the stream received at and transmitted by VIF 414. As mentioned previously, in some embodiments, CPU 418 can perform transcoding in cases where the format in which the data stored in third voice memory buffer (VMEM3) 624 differs from the format in which the data is stored in fourth voice memory buffer (VMEM4) 626.

Referring once again to FIG. 6, CPU 418 of central processing unit section 417 provides a copy of the digital audio data associated with the response (e.g., "Hi") to a fourth voice memory buffer (VMEM4) 626 for storage and eventual delivery to phone 610 for transmission to phone 612 through the cellular network (not shown). As illustrated in FIG. 6, the copy of the audio data associated with the response is delivered to VIF 414 as Link 2-output (Link 2-out), since this data is associated with the second audio data (Link 2). After processing by VIF 414, the copy of the digital audio data is passed to the baseband module 412 for further processing. As discussed above, deserialization and encoding of the voice data can be performed by VIF 414 and/or baseband module 412. After processing by baseband module 412, the audio data is transmitted through antenna 205 to phone 610, thereby providing hands free operation as desired. Thus, the word "Hi" that was originally received at local microphone 634 of Bluetooth speaker 630 is transmitted to phone 612 through the cellular network (not shown). It should be noted that the hands free operation illustrated in FIG. 6 is enabled by the internal routing performed in the Bluetooth/Wi-Fi connection chip 410 without interaction with other components of the home automation hub and without use of the I2S bus.

As discussed above, Link 1-in and Link 1-out represent two audio streams and Link 2-in and Link 2-out can represent two audio streams, resulting in a total of four audio streams, which can be considered as two bidirectional voice streams. In another representation, Link 1-in and Link 1-out represent a first unidirectional audio stream and Link 2-in and Link 2-out represent a second unidirectional audio stream, thereby resulting in two unidirectional audio streams forming a bidirectional audio stream. Thus, in the embodiment illustrated in FIG. 6, one representation includes four unidirectional audio streams, which can be considered as two bidirectional voice streams, are represented by Link 1-in, Link 1-out, Link 2-in, and Link 2-out.

Figure 7:
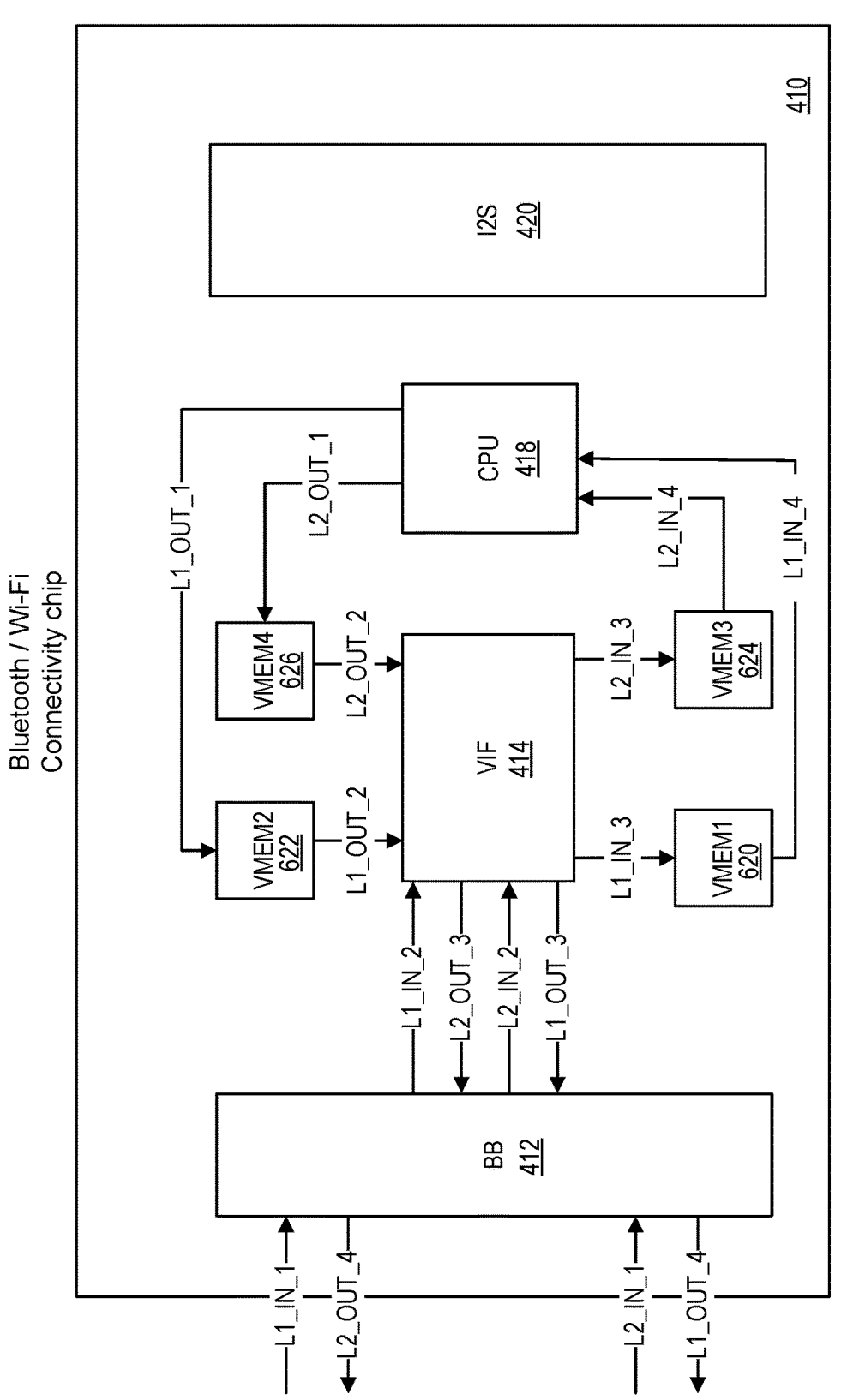
FIG. 7 is another functional diagram illustrating audio data flow using internal Bluetooth audio routing according to examples of the present disclosure.

FIG. 7 is another functional diagram illustrating audio data flow using internal Bluetooth audio routing according to examples of the present disclosure. The audio data flow illustrated in FIG. 7 corresponds to the examples discussed in relation to FIGS. 5 and 6, focusing on operations performed in Bluetooth/Wi-Fi connectivity chip 410. As described herein, hands free bidirectional communication using a Bluetooth speaker, including a local speaker and a local microphone, in conjunction with a phone and a home automation hub that does not include an internal or local speaker, is enabled by embodiments of the present disclosure. Although not illustrated in FIG. 7 for purposes of clarity, phone 610 illustrated in FIG. 6 can be used in a hands free mode in which local speaker 632 and local microphone 634 of Bluetooth speaker 630 illustrated in FIG. 6 are utilized to provide audio output and input for phone 610. Thus, embodiments of the present disclosure provide internal Bluetooth audio routing that enables two Bluetooth audio links to be supported simultaneously.

Referring to FIG. 7, Link 1 audio data is received from the phone (not shown) at an antenna (not shown) as L1_IN_1. The Link 1 data path for audio data can also be identified as a first communication channel or a downstream communication channel as the data from the phone is transmitted downstream from the phone to the Bluetooth speaker for broadcast through local speaker 632 of the Bluetooth speaker 630 as illustrated in FIG. 6. Thus, as phone 610 transmits the Link 1 audio data in hands free mode, the audio data is broadcast from the local microphone of the Bluetooth speaker as described more fully below.

The Link 1 audio data L1_IN_1 is processed by baseband module 412 of Bluetooth hardware element section 411 of Bluetooth/Wi-Fi connectivity chip 410. The baseband unit 412 of the hardware element section 411 converts the received signal (L1_in_1) to a digital signal and passes the digitized audio data to the voice interface (VIF) 414 of the hardware element section 411 of Bluetooth/Wi-Fi connectivity chip 410. Serialization of the received signal is typically performed by the baseband unit 412 although this process can alternatively be performed by the voice interface 414. Moreover, decoding of the serialized audio data can be performed by baseband unit 412 of hardware element section 411 or can be performed by one or more of the voice memory buffers described more fully below.

After processing by the baseband module 412 of hardware element section 411, the digital audio stream L1_IN_2 is passed to voice interface 414 of Bluetooth hardware element section 411 of Bluetooth/Wi-Fi connectivity chip 410. Voice interface 414 operates in a streaming manner, accordingly, a discrete portion of the incoming data stream is stored in voice memory buffer 620 of Bluetooth hardware element section 411 of Bluetooth/Wi-Fi connectivity chip 410 as L1_IN_3. Accordingly, first voice memory buffer (VMEM1) 620 Bluetooth hardware element section 411 of Bluetooth/Wi-Fi connectivity chip 410 is utilized to capture and store a copy of a portion of the stream received at and transmitted by VIF 414.

The CPU 418 receives input L1_IN_4, which is still referred to as in input audio stream because it is received as an input to CPU 418 of central processing unit section 417. The CPU 418 makes a copy of the digital audio stream as L1_OUT_1, since this data is associated with the first audio data (Link 1) and is received as an output to CPU 418 of central processing unit section 417. In some embodiments, CPU 418 can perform transcoding in cases where the format in which the data stored in first voice memory buffer (VMEM1) 620 differs from the format in which the data is stored in second voice memory buffer (VMEM2) 622. Similarly, CPU 418 can perform transcoding in cases where the format in which the data stored in third voice memory buffer (VMEM3) 624 differs from the format in which the data is stored in fourth voice memory buffer (VMEM4) 626. The ability to implement this transcoding will enable operation of the internal routing process across a wider variety of devices since differing data formats are enabled.

L1_OUT_1 is stored in voice memory buffer (VMEM2) 622 of Bluetooth hardware element section 411 of Bluetooth/Wi-Fi connectivity chip 410. This copy of the input audio stream is provided to voice interface 414 of Bluetooth hardware element section 411 of Bluetooth/Wi-Fi connectivity chip 410 as input L1_OUT_2. After processing by VIF 414, the copy of the digital audio data is passed to baseband module of Bluetooth hardware element section 411 of Bluetooth/Wi-Fi connectivity chip 410 as L1_OUT_3 for further processing. Deserialization and encoding of the voice data can be performed by VIF 414 and/or baseband module 412. After processing by the baseband unit, L1_OUT_4 is transmitted to the Bluetooth speaker through an antenna (not shown) as audio output to be broadcast through local speaker 632 of Bluetooth speaker 630. Thus, the link 1 audio data, after internal routing as L1_IN_1, L1_IN_2, L1_IN_3, L1_IN_4, L1_OUT_1, L1_OUT_2, L1_OUT_3, and L1_OUT_4, is provided as output from the Bluetooth speaker. As illustrated in FIG. 7, L1_IN_1, L1_IN_2, L1_IN_3, and L1_IN_4 can be considered as one audio stream and L1_OUT_1, L1_OUT_2, L1_OUT 3, and L1_OUT_4 can be considered as a separate audio stream. The Link 1 audio data, which would typically be directed to the application processor through the I2S bus, is redirected to CPU 418. The Link 2 audio data, which connects the CPU and the Bluetooth speaker 630 (not shown) through second voice memory buffer (VMEM2) 622, VIF 414, and baseband unit 412, can be considered as a second audio stream. Accordingly, in the embodiment illustrated in FIG. 7, a unidirectional audio stream is represented by L1_IN_1, L1_IN_2, L1_IN_3, and L1_IN_4 and L1_OUT_1, L1_OUT_2, L1_OUT_3, and L1_OUT_4, respectively, providing a unidirectional connection between phone 610 and Bluetooth speaker 630 via the central processing unit of the Bluetooth/Wi-Fi connectivity chip 410. As described below on relation to Link 2, a reverse link is provided from L2_IN_1, L2_IN_2, L2_IN_3, and L2_IN 4 and L2_OUT_1, L2_OUT_2, L2_OUT_3, and L2_OUT_4, respectively, providing a unidirectional connection between the microphone of Bluetooth speaker 630 and phone 610 via the central processing unit of the Bluetooth/Wi-Fi connectivity chip 410.

Link 2 audio data, which is the response received using the local microphone of the Bluetooth speaker (not shown), is represented as L2_IN_1. This response is referred to as second audio data and the data path is identified as a second communication channel (L2), which can also be referred to as Link 2. In a manner similar to the downstream data path, this second communication channel can be referred to as an upstream data path as the data is transmitted upstream from the local microphone of the Bluetooth speaker to the phone (not shown).

The Link 2 audio data L2_IN_1, after being received using the antenna of the home automation hub (not shown), is processed by baseband module 412 of hardware element section 411 of Bluetooth/Wi-Fi connectivity chip 410. In a manner similar to that discussed in relation to receipt of the Link 1 audio data L1_IN_1 by Bluetooth/Wi-Fi connectivity chip 410, baseband unit 412 converts the received signal (L2_IN_1) to a digital signal and passes the digital audio stream L2_IN_2 to voice interface (VIF) 414. As an example, serialization of the received signal (Link 2) can be performed by baseband unit 412 and decoding of the serialized digital data can be performed by voice interface (VIF) 414.

The digital audio data associated with the response, also referred to as voice data, is stored in third voice memory buffer (VMEM3) 624 of hardware element section 411 of Bluetooth/Wi-Fi connectivity chip 410 as L2_IN_3, for example, after conversion from byte format to a serial bit format. The CPU 418 of central processing unit section 417 receives input L2_IN_4 and makes a copy of the digital audio stream as L2_OUT_1, which is stored in voice memory buffer 626. As mentioned previously, in some embodiments, CPU 418 can perform transcoding in cases where the format in which the data stored in third voice memory buffer (VMEM3) 624 differs from the format in which the data is stored in fourth voice memory buffer (VMEM4) 626. As illustrated in FIG. 7, the copy of the audio data associated with the response is delivered to VIF 414 as L2_OUT_2, since this data is associated with the second audio data (Link 2). It will be appreciated that VIF 414 operates in a streaming manner in which data is not stored. Thus, fourth voice memory buffer (VMEM4) 626 is utilized to capture and store a copy of a portion of the stream received from CPU 418 for transmission to VIF 414. This copy is provided to voice interface 414 as input L2_OUT_2 and output, after processing by the voice interface (VIF) 414 to baseband unit (BB) 412 as L2_OUT_3. After processing by the baseband unit (BB) 412, the output associated with Link 2 (L2_OUT_4) is transmitted to the phone as audio output. Thus, the link 2 audio data, after internal routing, is provided as output from the phone. Thus, the response that was originally received at the local microphone of the Bluetooth speaker (e.g., local microphone 632 of Bluetooth speaker 630 in FIG. 6) is transmitted to the phone (e.g., phone 612 in FIG. 6) through the cellular network (not shown). It should be noted that the hands free operation illustrated in FIG. 7 is enabled by the internal routing performed in the Bluetooth/Wi-Fi connection chip 410 without interaction with other components of the home automation hub and without use of the I2S bus. The internal audio routing utilizes one or more wired audio links that connect the elements of the Bluetooth/Wi-Fi connectivity chip, thereby forming a wired portion of the wireless audio links connecting the phone and the Bluetooth speaker via the Bluetooth/Wi-Fi connectivity chip and the Bluetooth speaker and the phone via the Bluetooth/Wi-Fi connectivity chip.

Figure 8:
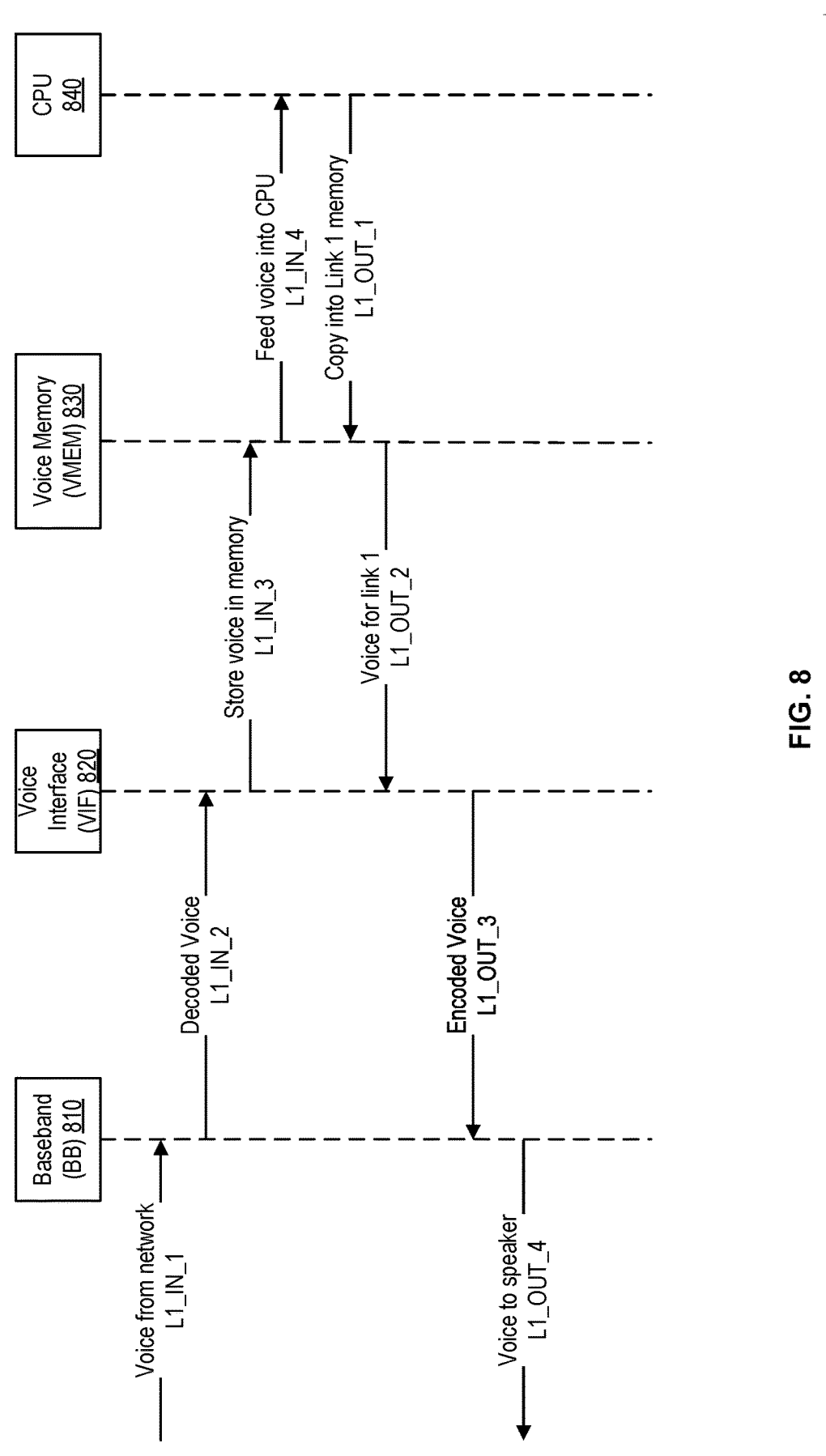
FIG. 8 illustrates a communications sequence diagram for delivery of audio data from a remote caller to a Bluetooth speaker according to examples of the present disclosure.

FIG. 8 illustrates a communications sequence diagram for delivery of audio data from a remote caller to a Bluetooth speaker according to examples of the present disclosure. The communications flow illustrated in FIG. 8 relates to downstream data from the phone (e.g., phone 510 illustrated in FIG. 5 or phone 610 illustrated in FIG. 6) to the Bluetooth speaker (e.g., Bluetooth speaker 530 illustrated in FIG. 5 or Bluetooth speaker 630 illustrated in FIG. 6). The sequence diagram corresponds to the audio data flow that was discussed in relation to FIG. 7, focusing on operations performed in the hardware element section 411 and the central processing unit section 417 of Bluetooth/Wi-Fi connectivity chip 410. In particular baseband module (BB) 810, voice interface (VIF) 820, and voice memory buffer (VMEM) 830 correspond to dedicated hardware elements present in the hardware element section 411 of Bluetooth/Wi-Fi connectivity chip 410 illustrated in FIG. 4. The CPU 840 corresponds to dedicated hardware elements present in the central processing unit section 417 of Bluetooth/Wi-Fi connectivity chip 410 illustrated in FIG. 4.

As illustrated in FIG. 8, the voice data from the network (i.e., received by the phone) is transmitted to the home automation hub and received by the baseband module (BB) 810 as L1_IN_1, which represents a first communication link (L1) as input to the central processing unit section of the Bluetooth/Wi-Fi connectivity chip (IN) at a first stage (1). Referring to FIGS. 5 and 6, L1_IN_1 corresponds to communication link 1 502 in FIG. 5 and communication link 1 602 in FIG. 6. The baseband module (BB) 810 performs several functions that are utilized to enable high performance Bluetooth operation. The functions performed by baseband module (BB) 810 can include serialization of the incoming voice data to provide a digital data stream and deserialization of outgoing voice data to provide an analog data stream, as well as decoding and encoding of packets. As an example, embodiments of the present disclosure can utilize codecs including the continuously variable slope delta modulation (CVSD) voice coding method in which a delta modulation with variable step size is utilized. As another example, embodiments of the present disclosure can utilize a modified subband codec (mSBC), which is an audio subband codec specified by the Bluetooth protocol.

Decoding of the voice data received by the baseband module (BB) 810 is performed as illustrated in FIG. 8 and, as discussed more fully below, encoding of voice data received from voice interface module (VIF) 820 is performed by baseband module (BB) 810. As discussed in relation to FIG. 4, serialization/deserialization and decoding/encoding performed by baseband processor (BB) 412 provides a serialized and decoded digital stream that is input to voice interface (VIF) 414.

In the embodiment illustrated in FIG. 8, decoding of the voice data is performed by the baseband module (BB) 810, but this is not required by the present disclosure as discussed in relation to FIG. 4. As will be evident to one of skill in the art, encoded data could be provided to the voice interface (VIF) 820, which can them perform decoding operations.

The decoded voice stream after baseband processing, represented by L1_IN_2, is then provided to the voice interface (VIF) 820. The voice interface (VIF) 820 operates in a streaming manner, receiving and processing the incoming decoded voice stream. In order to store discreet portions of the incoming decoded voice stream, the decoded voice stream is passed to voice memory buffer (VMEM) 830 as L1_IN_3, where it is stored in memory. From the voice memory buffer (VMEM) 830, the audio data is provided to the CPU 840 as L1_IN 4.

The CPU 840 operates in such a manner to provide a copy of the decoded voice that was stored in voice memory buffer (VMEM) 830 for storage in memory as L1_OUT_1. It will be appreciated that different portions of the voice memory buffer (VMEM) 830 can be utilized to store copies of the decoded voice in the input path and the output path, for example, first voice memory buffer (VMEM1) 620 of FIG. 6 in the input path and second voice memory buffer (VMEM2) 622 in the output path, both of which can be considered elements or portions of voice memory buffer (VMEM) 830.

The memory buffer (VMEM) 830 provides the voice data for the output path of Link 1 as L1_OUT_2, which is provided to the voice interface (VIF) 820 for processing. Processing by the voice interface (VIF) 820 can include encoding in accordance with the CVSD voice coding method or the modified subband codec (mSBC) voice coding method discussed above, or other suitable encoding/decoding methods. After processing by voice interface (VIF) 820, the audio data is sent as L1_OUT_3 to baseband unit (BB) 810 for baseband processing. After baseband processing by baseband unit (BB) 810, the voice data, illustrated as L1_OUT_4, is sent to the local speaker of the Bluetooth speaker. Thus, the input and output paths for downstream audio data routed through the home automation hub utilizing internal audio routing is enabled by the communications sequence diagram illustrated in FIG. 8. The internal audio routing illustrated in FIG. 8 utilizes one or more wired audio links that connect the elements of the Bluetooth/Wi-Fi connectivity chip, thereby forming a wired portion of the wireless audio links connecting the phone and the Bluetooth speaker via the Bluetooth/Wi-Fi connectivity chip and the Bluetooth speaker and the phone via the Bluetooth/Wi-Fi connectivity chip.

Figure 9:
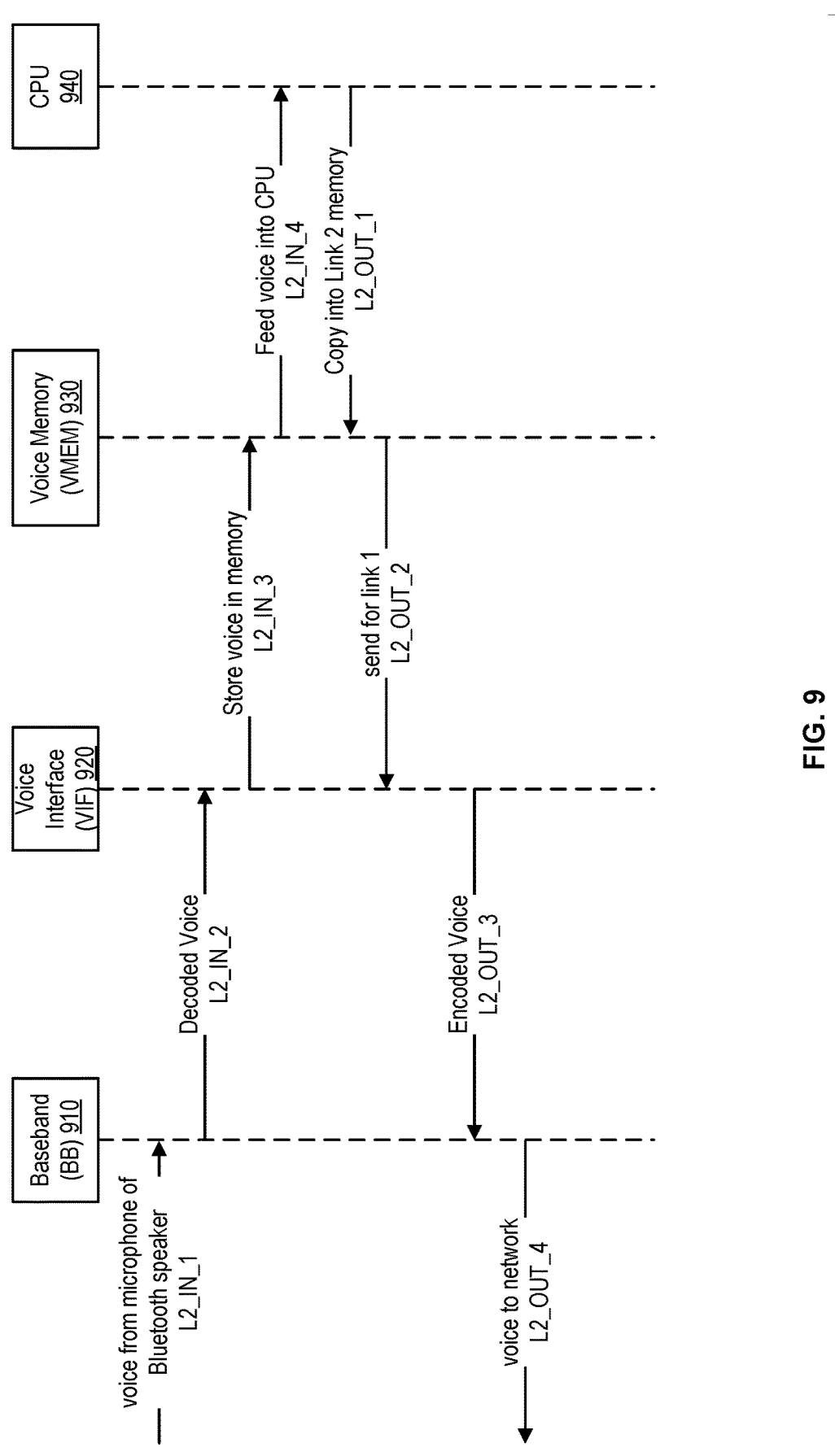
FIG. 9 illustrates a communications sequence diagram for delivery of audio data from a local microphone of a Bluetooth speaker to a remote caller according to examples of the present disclosure.

FIG. 9 illustrates a communications sequence diagram for delivery of audio data from a local microphone of a Bluetooth speaker to a remote caller according to examples of the present disclosure. The communications flow illustrated in FIG. 9 relates to upstream data from the local microphone of the Bluetooth speaker (e.g., local microphone 532 of Bluetooth speaker 530 illustrated in FIG. 5 or local microphone 632 of Bluetooth speaker 630 illustrated in FIG. 6) to the phone/network (e.g., phone 510 illustrated in FIG. 5 or phone 610 illustrated in FIG. 6). The sequence diagram corresponds to the audio data flow that was discussed in relation to FIG. 7, focusing on operations performed in the hardware element section 411 and the central processing unit section 417 of Bluetooth/Wi-Fi connectivity chip 410. In particular baseband module (BB) 810, voice interface (VIF) 820, and voice memory buffer (VMEM) 830 correspond to dedicated hardware elements present in the hardware element section 411 of Bluetooth/Wi-Fi connectivity chip 410 illustrated in FIG. 4. The CPU 840 corresponds to dedicated hardware elements present in the central processing unit section 417 of Bluetooth/Wi-Fi connectivity chip 410 illustrated in FIG. 4. It should be noted that although different reference numbers are utilized in FIGS. 8 and 9 for baseband module (BB) 810 and baseband module (BB) 910; voice interface (VIF) 820 and voice interface (VIF) 920; and voice memory buffer (VMEM) 830 and voice memory buffer (VMEM) 930, these elements may share common components or may represent different hardware elements of the dedicated hardware elements present in the hardware element section 411 of Bluetooth/Wi-Fi connectivity chip 410 illustrated in FIG. 4. In particular, different portions of a voice memory buffer can be utilized to store Link 1 and Link 2 data, both for the input path and for the output path. Moreover, although CPU 840 and CPU 940 are illustrated in FIGS. 8 and 9, respectively, a single CPU can perform the processes described herein in relation to FIGS. 8 and 9.

As illustrated in FIG. 9, the voice data from the local microphone of the Bluetooth speaker, also referred to as voice data from the Bluetooth speaker since the Bluetooth speaker provides both audio input and output functionality, is transmitted to the home automation hub and received by the baseband module (BB) 910 as L2_IN_1, which represents a second communication link (L2) as input to the central processing unit section of the Bluetooth/Wi-Fi connectivity chip (IN) at a first stage (1). Referring to FIGS. 5 and 6, L2_IN_1 corresponds to communication link 2 503 in FIG. 5 and communication link 2 603 in FIG. 6. The baseband module (BB) 910 performs several functions that are utilized to enable high performance Bluetooth operation. The functions performed by the baseband module (BB) 910 can include serialization of the incoming voice data to provide a digital data stream and deserialization of outgoing voice data to provide an analog data stream, as well as decoding and encoding of packets. As an example, embodiments of the present disclosure can utilize codecs including the continuously variable slope delta modulation (CVSD) voice coding method in which a delta modulation with variable step size is utilized. As another example, embodiments of the present disclosure can utilize a modified subband codec (mSBC), which is an audio subband codec specified by the Bluetooth protocol.

Decoding of the voice data received by the baseband module (BB) 910 is performed as illustrated in FIG. 9 and, as discussed more fully below, encoding of voice data received from voice interface module (VIF) 920 is performed by baseband module (BB) 910. As discussed in relation to FIG. 4, serialization/deserialization and decoding/encoding performed by baseband processor (BB) 412 provides a serialized and decoded digital stream that is input to voice interface (VIF) 414.

In the embodiment illustrated in FIG. 9, decoding of the voice data is performed by the baseband module (BB) 910, but this is not required by the present disclosure as discussed in relation to FIG. 4. As will be evident to one of skill in the art, encoded data could be provided to the voice interface (VIF) 920, which can them perform decoding operations.

The decoded voice stream after baseband processing, represented by L2_IN_2, is then provided to the voice interface (VIF) 920. The voice interface (VIF) 920 operates in a streaming manner, receiving and processing the incoming decoded voice stream. In order to store discreet portions of the incoming decoded voice stream, the decoded voice stream is passed to voice memory buffer (VMEM) 930 as L2_IN_3, where it is stored in memory. From the voice memory buffer (VMEM) 930, the audio data is provided to the CPU 940 as L2_IN 4.

The CPU 940 operates in such a manner as to provide a copy of the decoded voice that was stored in voice memory buffer (VMEM) 930 for storage in memory as L2_OUT_1. It will be appreciated that different portions of the voice memory buffer (VMEM) 930 can be utilized to store copies of the decoded voice in the input path and the output path, for example, first voice memory buffer (VMEM1) 620 of FIG. 6 in the input path and second voice memory buffer (VMEM2) 622 in the output path, both of which can be considered elements or portions of voice memory buffer (VMEM) 930.

The memory buffer (VMEM) 930 provides the voice data for the output path of Link 2 as L2_OUT_2, which is provided to the voice interface (VIF) 920 for processing. Processing by the voice interface (VIF) 920 can include encoding in accordance with the CVSD voice coding method or the modified subband codec (mSBC) voice coding method discussed above, or other suitable encoding/decoding methods. After processing by voice interface (VIF) 920, the audio data is sent as L2_OUT_3 to baseband unit (BB) 910 for baseband processing. After baseband processing by baseband unit (BB) 910, the voice data, illustrated as L2_OUT_4, is sent to the phone for delivery to the network. Thus, the input and output paths for upstream audio data routed through the home automation hub utilizing internal audio routing is enabled by the communications sequence diagram illustrated in FIG. 9. The internal audio routing illustrated in FIG. 9 utilizes one or more wired audio links that connect the elements of the Bluetooth/Wi-Fi connectivity chip, thereby forming a wired portion of the wireless audio links connecting the phone and the Bluetooth speaker via the Bluetooth/Wi-Fi connectivity chip and the Bluetooth speaker and the phone via the Bluetooth/Wi-Fi connectivity chip.

FIG. 10 is a flowchart conceptually illustrating a method of performing a hands free phone call according to examples of the present disclosure. The method includes pairing a phone to a home automation hub (1010) and pairing a Bluetooth speaker to the home automation hub (1012). Thus, two Bluetooth devices are paired to the home automation hub, which, in some embodiments, does not include an internal speaker. In contrast with conventional methods in which a device, for example, a home automation hub, can only be paired to a single paired device, for example, a phone or a Bluetooth speaker, embodiments of the present disclosure utilize an internal routing implementation that enables bidirectional voice communications between a first paired device, the home automation hub, and a second paired device, with both paired devices being paired to the home automation hub.

The method also includes transmitting first audio data from the phone to the home automation hub (1014) and receiving the first audio data at the home automation hub (1016). The first audio data complies with the Bluetooth protocol in some embodiments. Receiving the first audio data at the home automation hub can include processing the first audio data using a baseband module and a voice interface module, both of which are elements of a Bluetooth/Wi-Fi connectivity chip included in the home automation hub. As described herein the baseband module and the voice interface module can be dedicated hardware elements present in a hardware element section of the Bluetooth/Wi-Fi connectivity chip. Additionally, the first digital audio data can be transcoded to provide first transcoded audio data and the first transcoded audio data can be stored in a third memory.

The method further includes storing first digital audio data related to the first audio data in a first memory (1018) and transmitting the first audio data to the Bluetooth speaker (1020). The first memory can be a dedicated hardware element present in the hardware element section of the Bluetooth/Wi-Fi connectivity chip. Thus, the audio data transmitted from the phone is reproduced at the local speaker of the Bluetooth speaker. The internal audio routing implemented in the Bluetooth/Wi-Fi connectivity chip enables a first wireless audio link to be established between the phone and the Bluetooth speaker via the home automation hub. As described herein, the wireless audio links include a wireless portion between the antenna and the corresponding phone/Bluetooth speaker and a wired audio link internally routed through the Bluetooth/Wi-Fi connectivity chip.

Additionally, the method includes transmitting second audio data from the Bluetooth speaker to the home automation hub (1022) and receiving the second audio data at the home automation hub (1024). The second audio data complies with the Bluetooth protocol in some embodiments. Receiving the second audio data at the home automation hub can include processing the second audio data using a baseband module and a voice interface module. Additionally, the second digital audio data can be transcoded to provide second transcoded audio data and the second transcoded audio data can be stored in a fourth memory.

The method further includes storing second digital audio data related to the second audio data in a second memory (1026) and transmitting the second audio data to the phone (1028). Transmitting the first audio data to the Bluetooth speaker and transmitting the second audio data to the phone, which are communicated via a bidirectional communication link, can be performed simultaneously, thereby enabling hands free operation of the phone via the home automation hub and the Bluetooth speaker. The internal audio routing implemented in the Bluetooth/Wi-Fi connectivity chip enables a second wireless audio link to be established between the Bluetooth speaker and the phone via the home automation hub.

Some or all of the processes, including process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    pairing a hub with a first device;
    pairing the hub with a second device;
    establishing a first audio link connecting the first device and the second device via a Bluetooth connectivity chip of the hub;
    establishing a second audio link connecting the second device and the first device via the Bluetooth connectivity chip;

receiving, by the hub, first audio data from the first device via the first audio link;
    sending, by a baseband processor of the Bluetooth connectivity chip, the first audio data to a central processing unit of the Bluetooth connectivity chip;
    performing, by the central processing unit, an audio processing operation on the first audio data to generate second audio data;
    sending, by the central processing unit, the second audio data to the baseband processor;
    sending, by the baseband processor, the second audio data to the second device via the first audio link;
    receiving, by the hub, third audio data from the second device via the second audio link; and
    sending, by the baseband processor, fourth audio data to the first device via the second audio link, the fourth audio data corresponding to the third audio data and generated by the central processing unit.

2. The computer-implemented method of claim 1, wherein the first audio link and the second audio link do not utilize an Inter-IC Sound (I2S) bus disposed between the Bluetooth connectivity chip and an application processor of the hub.

3. The computer-implemented method of claim 1, further comprising:
    storing, by a voice interface of the Bluetooth connectivity chip, the first audio data in a first buffer of a voice memory of the Bluetooth connectivity chip, wherein second audio data is generated by at least routing the first audio data from the first buffer of the voice memory to the central processing unit and from the central processing unit to a second buffer of the voice memory of the Bluetooth connectivity chip, wherein the second audio data is sent from the second buffer.

4. The computer-implemented method of claim 1, wherein the first audio data is sent to the central processing unit by at least storing, by the baseband processor, the first audio data in a memory of the Bluetooth connectivity chip and retrieving, by the central processing unit, the first audio data from the memory, and wherein the second audio data is sent to the baseband processor by at least storing, by the central processing unit, the second audio data in the memory and retrieving, by the baseband processor, the second audio data from the memory.

5. The computer-implemented method of claim 1, further comprising:
    determining that a condition associated with sending the first audio data to the central processing unit instead of an application processor is met, wherein the first audio data is sent, based at least in part on the condition being met, by the baseband processor to the central processing unit and bypasses sending the first audio data to the application processor over an Inter-IC Sound (I2S) bus.

6. A Bluetooth device, comprising:
    a Bluetooth connectivity chip including a baseband processor, a central processing unit, and a memory; and
    a non-transitory computer-readable storage medium comprising computer-readable instructions that, upon execution on the Bluetooth connectivity chip, cause the Bluetooth connectivity chip to perform operations comprising:
        receiving first audio data from a first device paired with the Bluetooth device;
        sending, by the baseband processor, the first audio data to the central processing unit;

performing, by the central processing unit, an audio processing operation on the first audio data to generate second audio data;

sending, by the central processing unit, the second audio data to the baseband processor;

sending, by the baseband processor, the second audio data to a second device paired with the Bluetooth device;

receiving third audio data from the second device; and routing the third audio data through the Bluetooth connectivity chip prior to sending, by the Bluetooth connectivity chip, fourth audio data to the first device, the fourth audio data corresponding to the third audio data.

7. The Bluetooth device of claim 6, further comprising computer-readable instructions that, upon execution on the Bluetooth connectivity chip, cause the Bluetooth connectivity chip to perform operations comprising:

establishing a first audio link between the first device and the second device via the Bluetooth device, the first audio link comprising a first link between the memory and the central processing unit and a second link between the memory and the baseband processor of the Bluetooth connectivity chip; and establishing a second audio link between the first device and the second device via the Bluetooth device, the second audio link comprising a third link between the memory and the central processing unit and the second link between the memory and the baseband processor.

8. The Bluetooth device of claim 7, wherein the first audio link and the second audio link comprise an extended Synchronous Connection Oriented (eSCO) channel in compliance with a Bluetooth protocol.

9. The Bluetooth device of claim 7, wherein the first audio link and the second audio link comprise concurrent Bluetooth audio links.

10. The Bluetooth device of claim 6, wherein the Bluetooth connectivity chip supports both a Bluetooth protocol and an 802.11 protocol.

11. The Bluetooth device of claim 6, wherein the Bluetooth device does not include a speaker.

12. The Bluetooth device of claim 6, wherein:

the Bluetooth connectivity chip further comprises a voice interface; and routing the first audio data and routing the third audio data comprises routing the first audio data and the second audio data through the baseband processor, the voice interface, the memory, and the central processing unit.

13. A computer-implemented method, comprising:

establishing, by a Bluetooth device, a first audio link between a first device and a second device via the Bluetooth device;

establishing, by the Bluetooth device, a second audio link between the second device and the first device via the Bluetooth device;

receiving, by the Bluetooth device, first audio data from the first device;

sending, by a baseband processor of a Bluetooth connectivity chip of the Bluetooth device, the first audio data to a central processing unit of the Bluetooth connectivity chip;

performing, by the central processing unit, an audio processing operation on the first audio data to generate second audio data;

sending, by the central processing unit, the second audio data to the baseband processor; and sending, by the baseband processor, the second audio data to the second device.

14. The computer-implemented method of claim 13, further comprising processing, by the Bluetooth device, the first audio data using the baseband processor and a voice interface of the Bluetooth connectivity chip.

15. The computer-implemented method of claim 13, further comprising:

receiving, by the Bluetooth device, third audio data from the second device;

generating, by the Bluetooth device, fourth audio data that corresponds to the third audio data by at least routing the third audio data internally to the Bluetooth connectivity chip; and sending, by the Bluetooth device, the fourth audio data to the first device wherein sending the second audio data to the second device and sending the fourth audio data to the first device are performed concurrently.

16. The computer-implemented method of claim 13, wherein the Bluetooth connectivity chip supports both a Bluetooth protocol and an 802.11 protocol.

17. The computer-implemented method of claim 13, wherein the Bluetooth device does not include a speaker.

18. The computer-implemented method of claim 13, wherein the second audio data is generated based on routing the first audio data internally to the Bluetooth connectivity chip via a first audio link that comprises an extended Synchronous Connection Oriented (eSCO) channel in compliance with a Bluetooth protocol.

19. The computer-implemented method of claim 13, wherein the second audio data is generated based on routing the first audio data through the baseband processor and the central processing unit.

20. The computer-implemented method of claim 13, wherein the second audio data is generated based on routing the first audio data via a first audio link.

* * * * *